United States Patent
Matsumoto et al.

(10) Patent No.: US 9,902,113 B2
(45) Date of Patent: Feb. 27, 2018

(54) METHOD FOR MANUFACTURING THREE-DIMENSIONAL SHAPED OBJECT AND THREE-DIMENSIONAL SHAPED OBJECT

(75) Inventors: Isamu Matsumoto, Osaka (JP); Satoshi Abe, Osaka (JP); Masataka Takenami, Osaka (JP); Yoshiyuki Uchinono, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 993 days.

(21) Appl. No.: 14/005,026

(22) PCT Filed: Mar. 15, 2012

(86) PCT No.: PCT/JP2012/057415
§ 371 (c)(1),
(2), (4) Date: Sep. 13, 2013

(87) PCT Pub. No.: WO2012/124828
PCT Pub. Date: Sep. 20, 2012

(65) Prior Publication Data
US 2014/0010908 A1    Jan. 9, 2014

(30) Foreign Application Priority Data
Mar. 17, 2011    (JP) ................................ 2011-059484

(51) Int. Cl.
*B29C 67/00*    (2017.01)
*B29C 33/76*    (2006.01)
(Continued)

(52) U.S. Cl.
CPC ........ *B29C 67/0074* (2013.01); *B22F 3/1055* (2013.01); *B22F 5/007* (2013.01);
(Continued)

(58) Field of Classification Search
None
See application file for complete search history.

(56) References Cited

U.S. PATENT DOCUMENTS

| 2004/0228754 | A1 | 11/2004 | Abe et al. |
| 2009/0121393 | A1 | 5/2009 | Abe |
| 2011/0287340 | A1* | 11/2011 | Mougin .................... C25B 9/00 |
| | | | 429/514 |

FOREIGN PATENT DOCUMENTS

| CN | 1496769 | 5/2004 |
| JP | 1-502890 | 10/1989 |

(Continued)

OTHER PUBLICATIONS

China Office action, dated Nov. 4, 2014 along with an english translation thereof.
(Continued)

*Primary Examiner* — Matthew Daniels
*Assistant Examiner* — Kimberly A Stewart
(74) *Attorney, Agent, or Firm* — Greenblum & Bernstein, P.L.C.

(57) ABSTRACT

There is provided a method for manufacturing a three-dimensional shaped object, comprising the steps of: (i) forming a solidified layer by irradiating a predetermined portion of a powder layer with a light beam, thereby allowing sintering of the powder of the predetermined portion or melting and subsequent solidification thereof; and (ii) forming another solidified layer by newly forming a powder layer on the resulting solidified layer, and then irradiating another predetermined portion of the new powder layer with the light beam, the steps (i) and (ii) being repeatedly performed, wherein the three-dimensional shaped object is manufactured such that it has three different solidified portions of high-density, intermediate-density and low-density solidified portions in at least a part of the object, and wherein the intermediate-density solidified portion is formed to be located in a part of a surface of the three-dimensional shaped object.

14 Claims, 16 Drawing Sheets

(51) Int. Cl.
  *B33Y 10/00* (2015.01)
  *B22F 3/105* (2006.01)
  *B22F 5/00* (2006.01)
  *B22F 7/00* (2006.01)

(52) U.S. Cl.
  CPC .............. *B22F 7/002* (2013.01); *B29C 33/76* (2013.01); *B29C 67/0077* (2013.01); *B33Y 10/00* (2014.12); *B22F 2998/10* (2013.01); *B22F 2999/00* (2013.01); *Y02P 10/292* (2015.11); *Y02P 10/295* (2015.11)

(56) References Cited

FOREIGN PATENT DOCUMENTS

| JP | 7-314456 | 12/1995 |
|----|----------|---------|
| JP | 7-314457 | 12/1995 |
| JP | 9-38750 | 2/1997 |
| JP | 2000-73108 | 3/2000 |
| JP | 2001-277368 | 10/2001 |
| JP | 2003-159755 | 6/2003 |
| JP | 2003-245981 | 9/2003 |
| JP | 2004-42459 | 2/2004 |
| JP | 2004-122490 | 4/2004 |
| JP | 2004-142427 | 5/2004 |
| JP | 2005-42179 | 2/2005 |
| JP | 2005-97692 | 4/2005 |
| JP | 2005-154831 | 6/2005 |
| JP | 2007-70655 | 3/2007 |
| WO | 88/02677 | 4/1988 |
| WO | 2007/058160 | 5/2007 |

OTHER PUBLICATIONS

International Serach Report, dated May 22, 2012.
English translation of International Preliminary Report on Patentability, dated Sep. 26, 2013.

* cited by examiner

Fig. 1
(a)
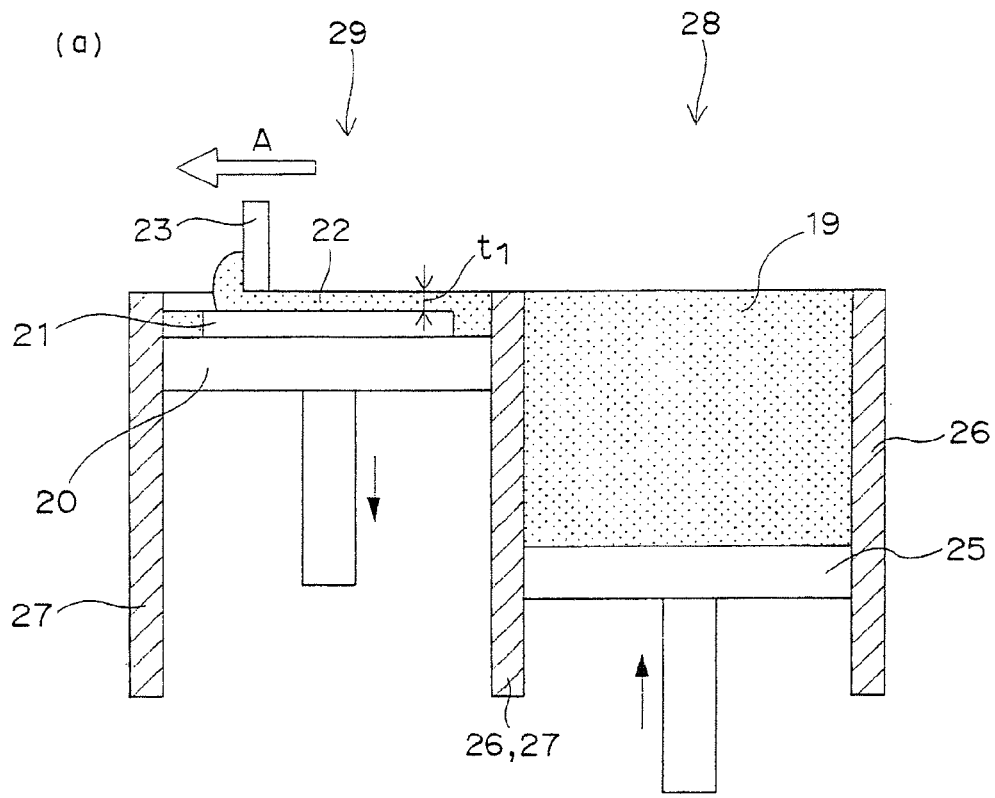
(b)
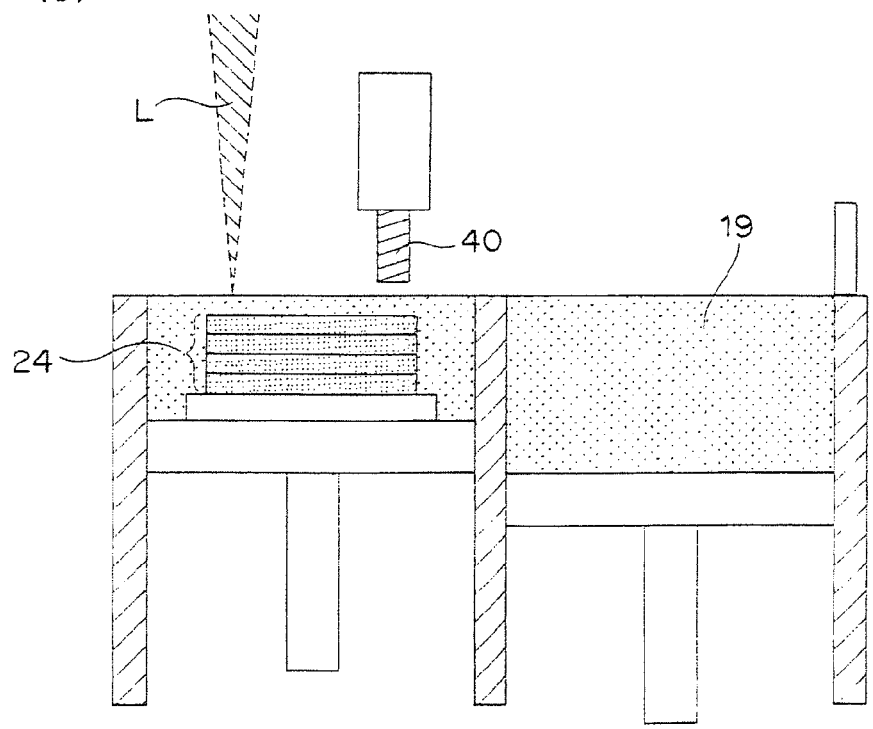

Fig. 2
(a)
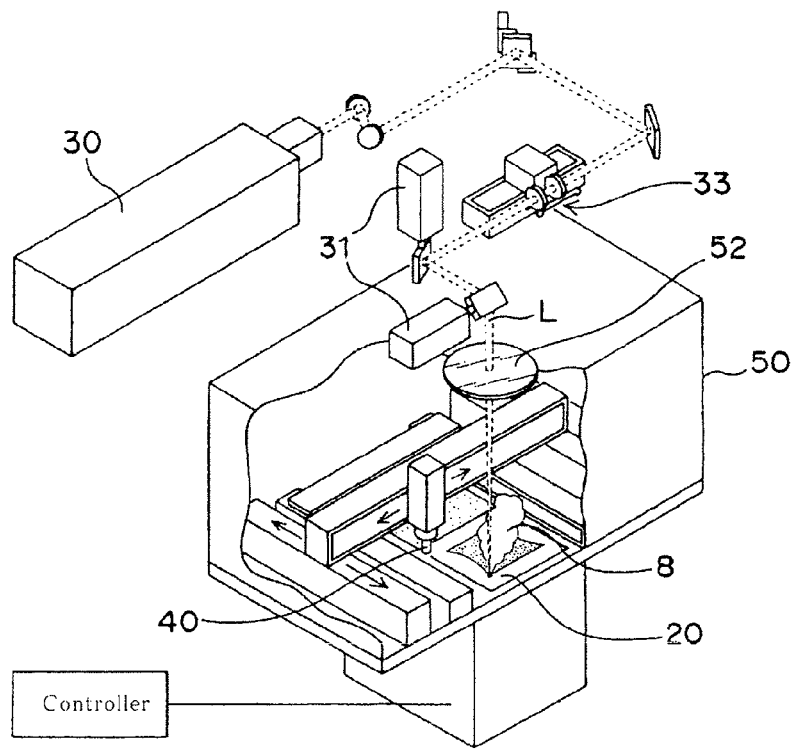
(b)
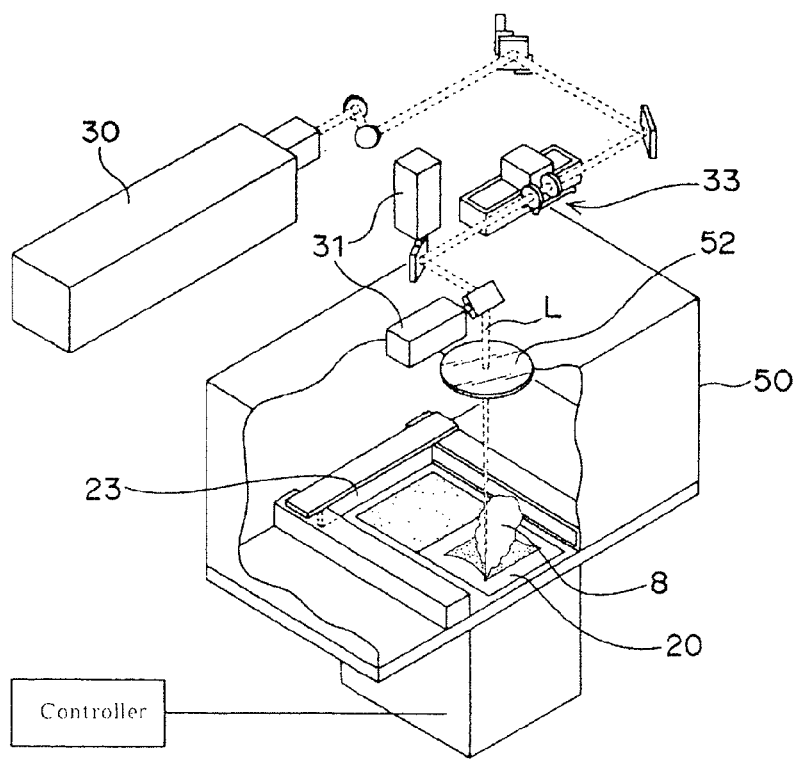

Fig. 7
(a) Front side
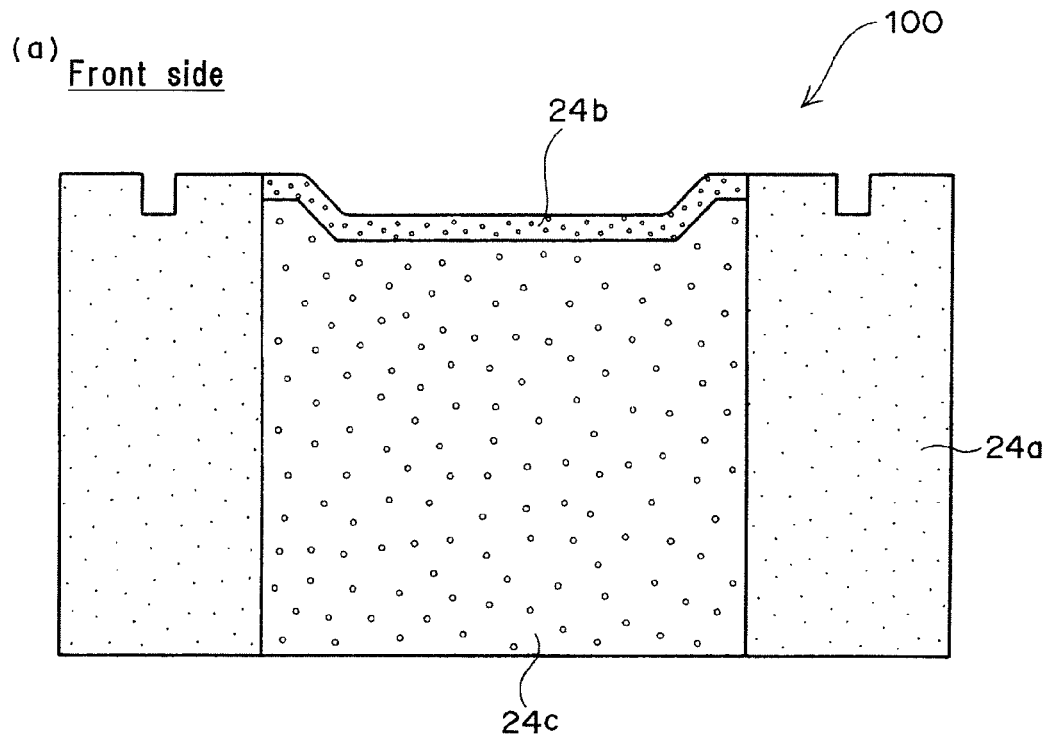
(b)
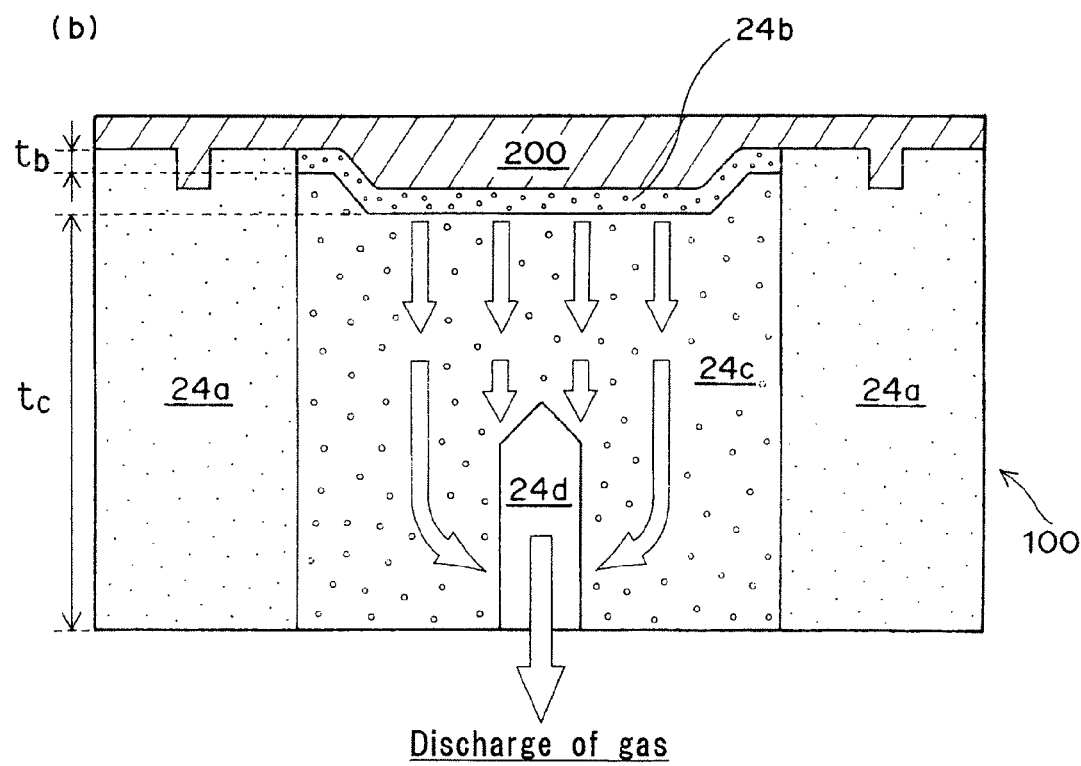
Discharge of gas

Fig. 8
(a)
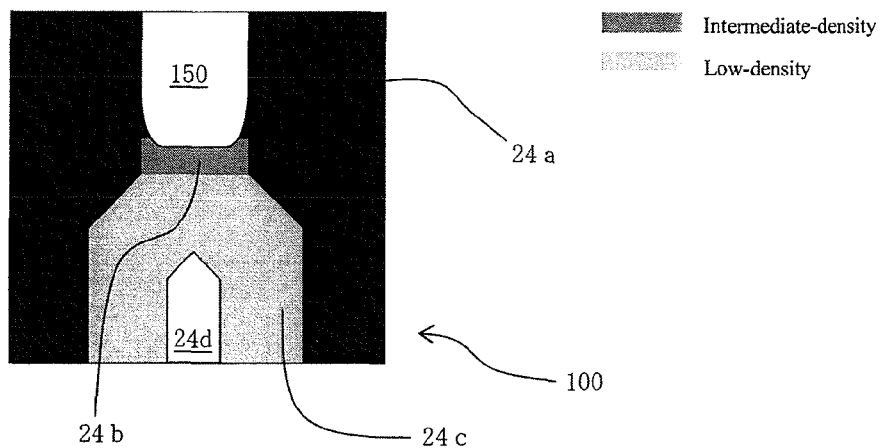
(b)
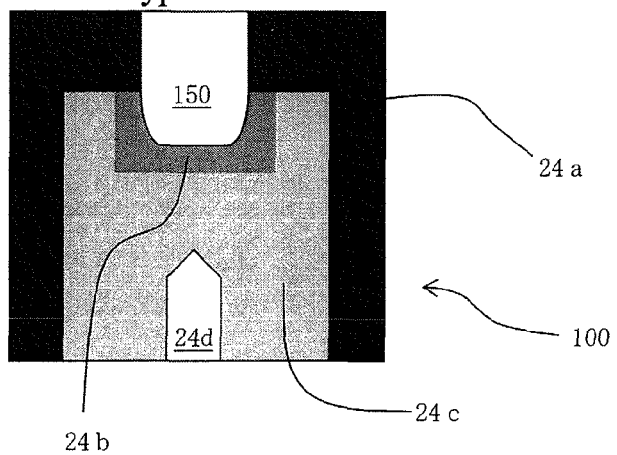
(c)
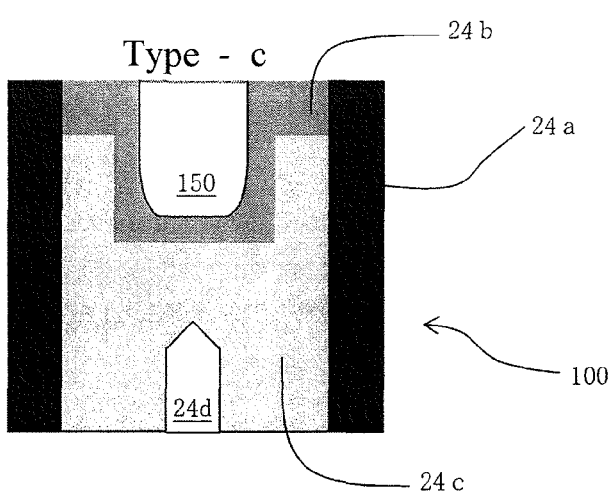

*Fig. 10*
(a)
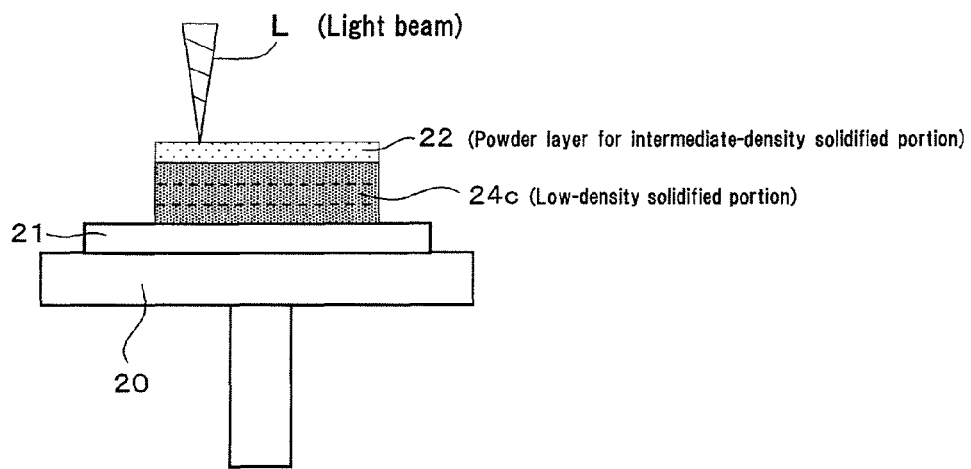
(b)
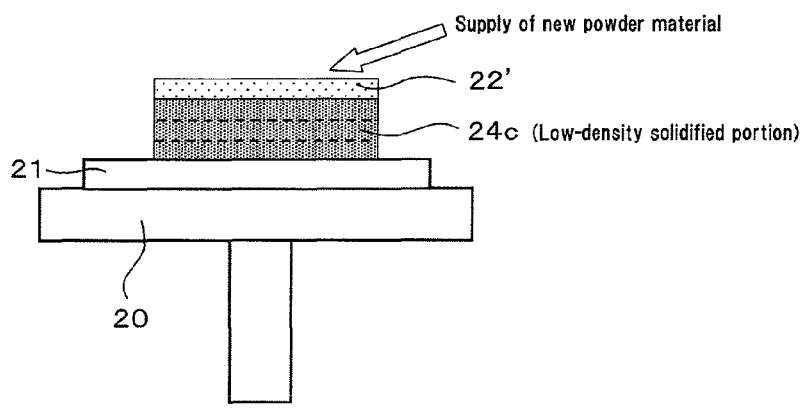
(c)
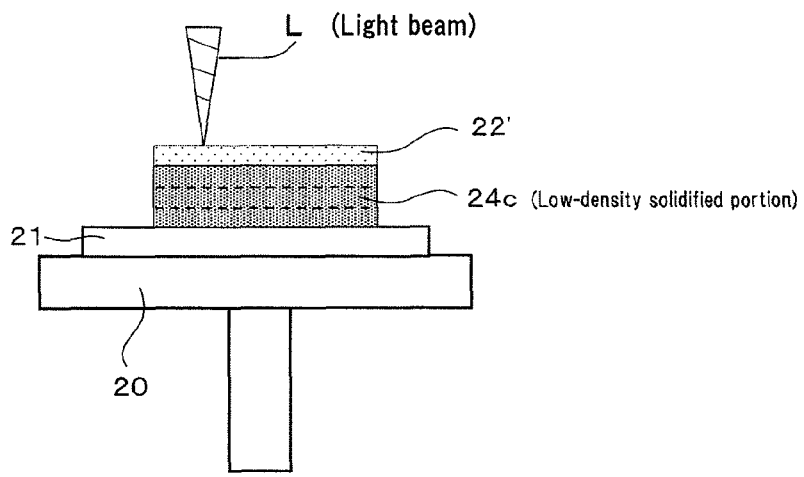

Fig. 11
(a)
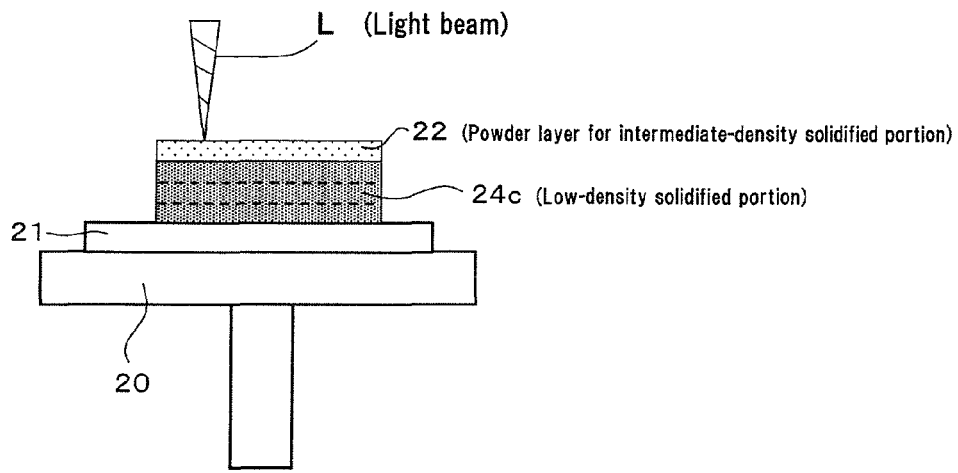
(b)
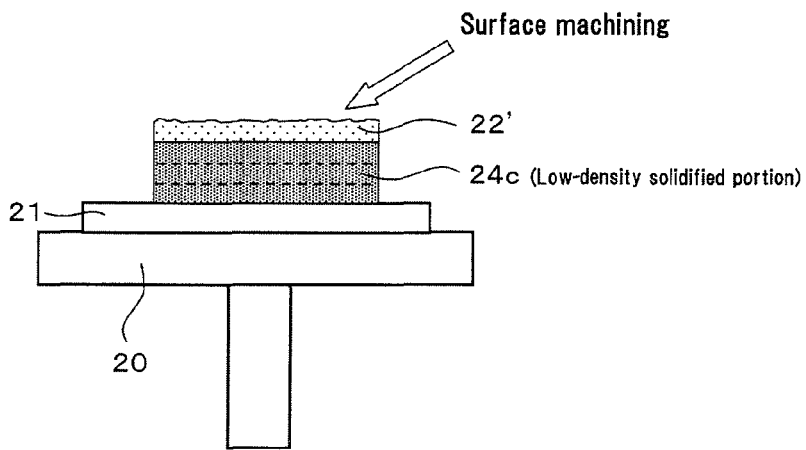
(c)
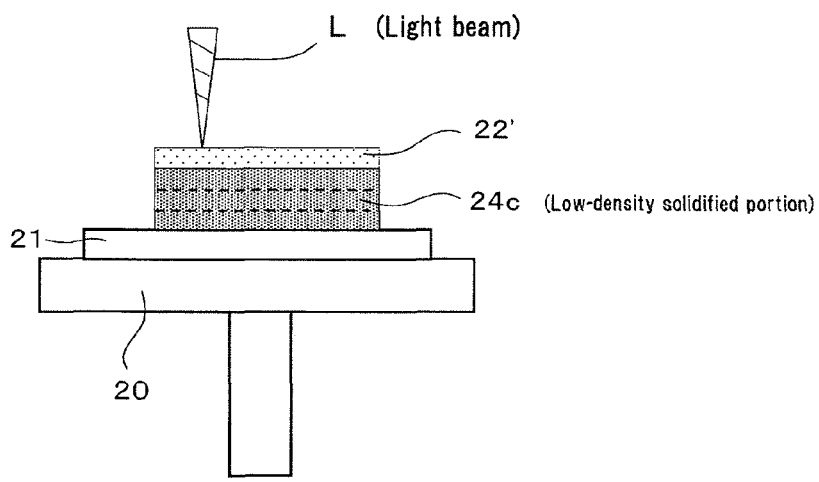

Fig. 12
(a)
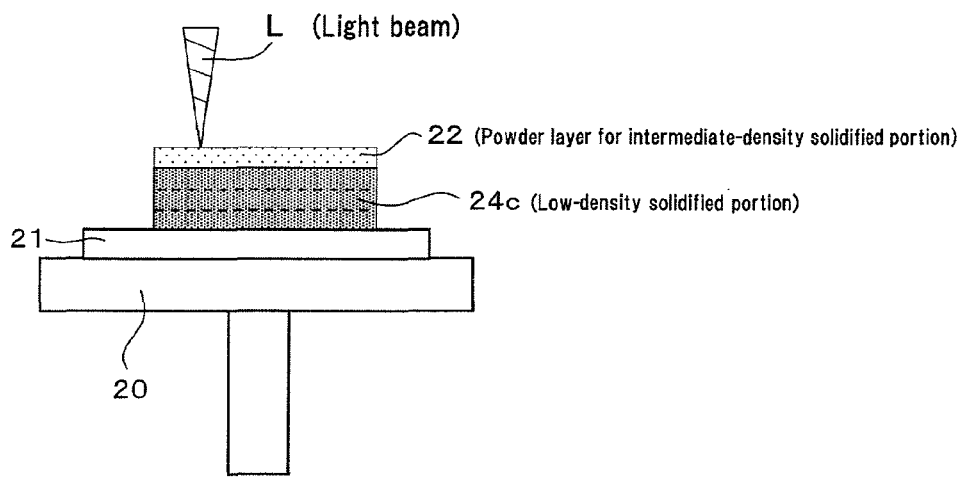
(b)
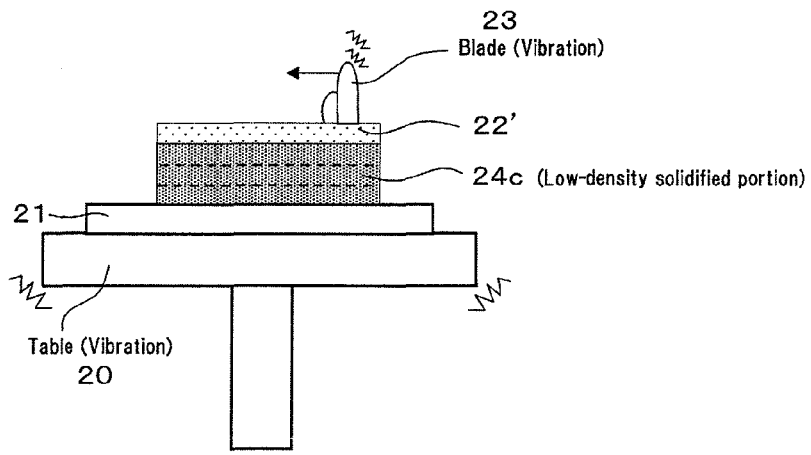
(c)
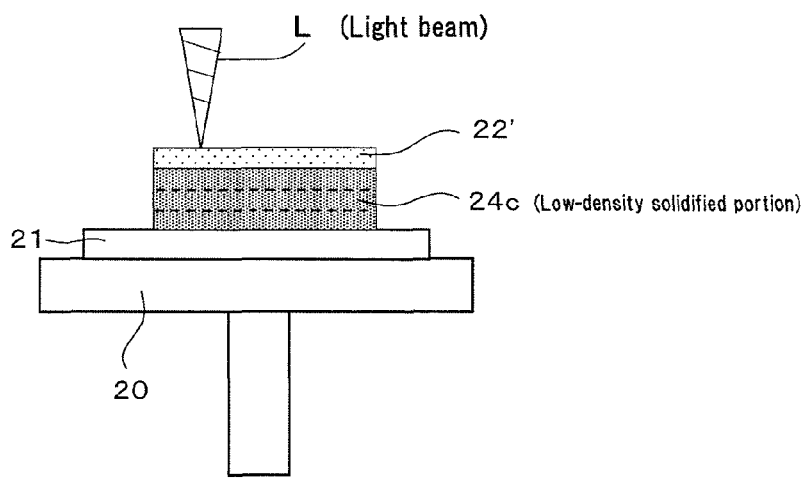

Fig. 13
(a)
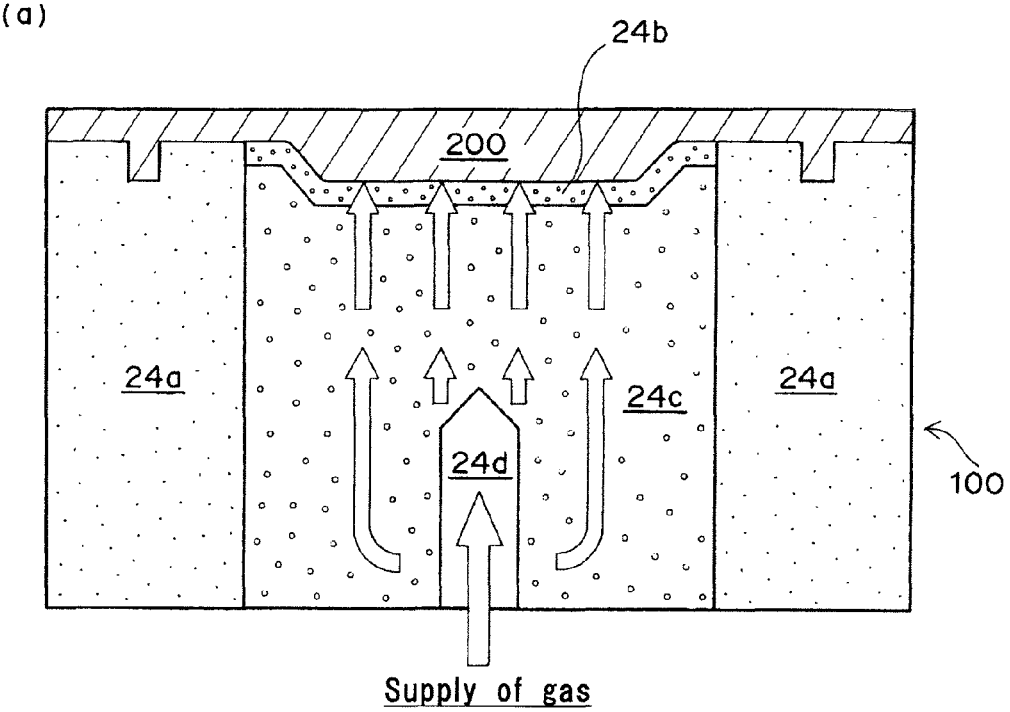
Supply of gas
(b)
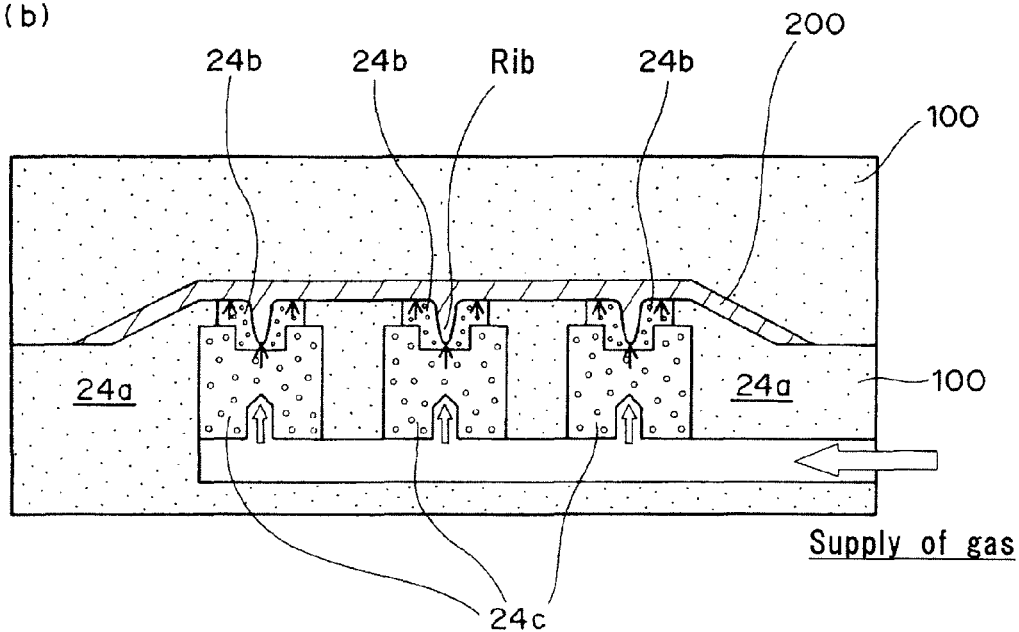
Supply of gas

Fig. 15

Confirmatory Test on Transfer of Pore Contour Shape

| | SEM image of Molded article | Surface state of molded article |
|---|---|---|
| Low-Density | 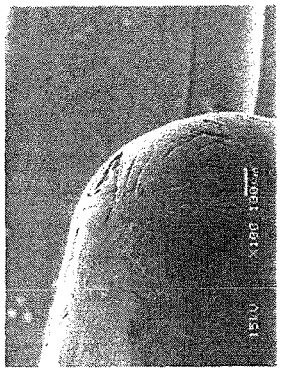 | Occurring of transfer of pore contour shape (Pore contour shape of the shaped object) |
| Intermediate-Density | 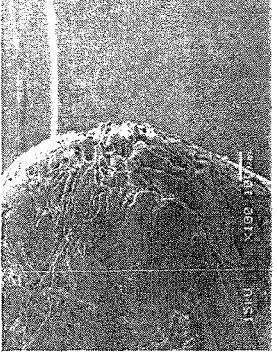 | Good mold filling<br><br>Good surface profile |
| High-Density (portion being limited to high-density) | 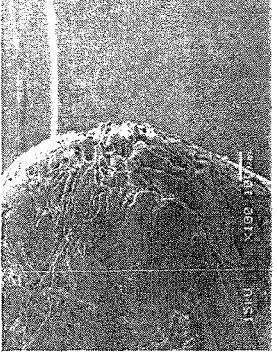 | Insufficient mold filling due to gas space |

Fig. 16
(a)
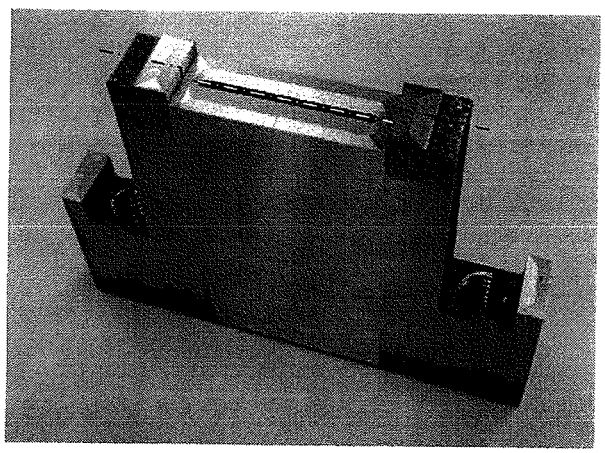
(b)
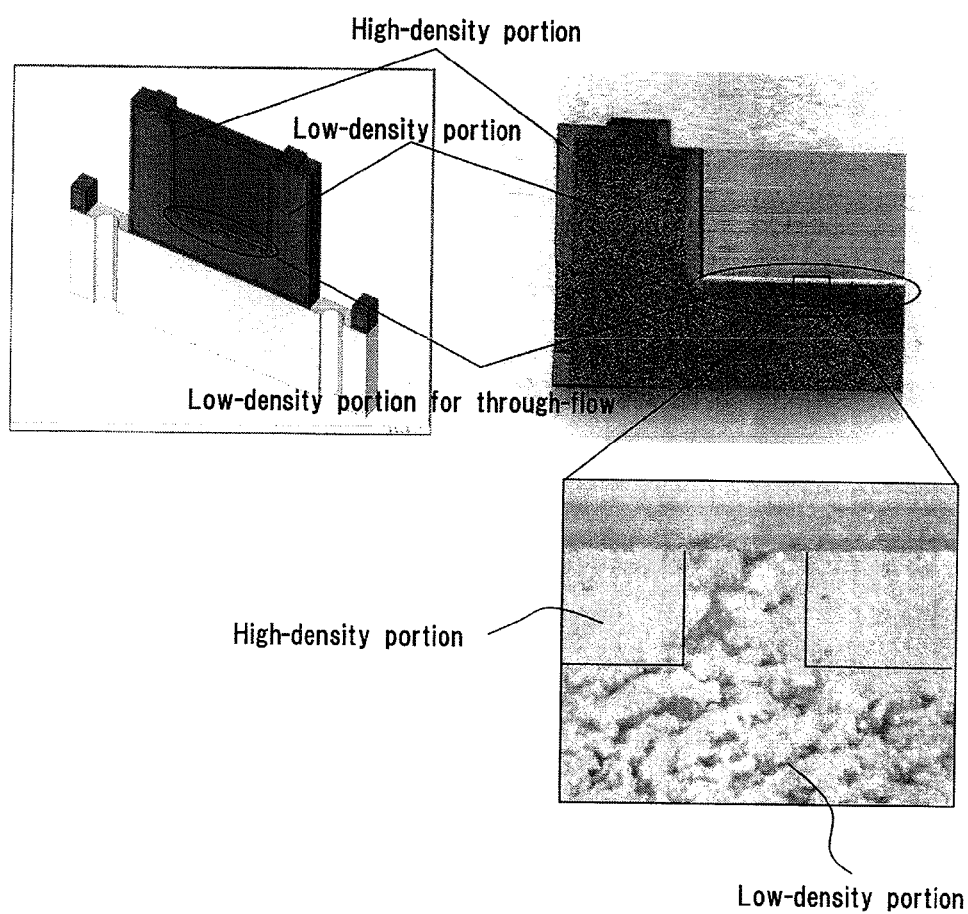

METHOD FOR MANUFACTURING THREE-DIMENSIONAL SHAPED OBJECT AND THREE-DIMENSIONAL SHAPED OBJECT

TECHNICAL FIELD

The present invention relates to a method for manufacturing a three-dimensional shaped object, and also relates to the three-dimensional shaped object obtained thereby. More particularly, the present invention relates to a method for manufacturing a three-dimensional shaped object with a plurality of solidified layers stacked integrally by repeating the step of forming a solidified layer by irradiating a predetermined portion of a powder layer with a light beam, and also relates to the three-dimensional shaped object obtained by such manufacturing method.

BACKGROUND OF THE INVENTION

Heretofore, a method for manufacturing a three-dimensional shaped object by irradiating a powder with a light beam has been known (such method can be generally referred to as "selective laser sintering method"). Such method can produce the three-dimensional shaped object with a plurality of solidified layers stacked integrally by repeating the step (i) of forming a solidified layer by irradiating a predetermined portion of a powder layer with a light beam, thereby allowing sintering of the predetermined portion of the powder or melting and subsequent solidification thereof, and the step (ii) of forming another solidified layer by newly forming a powder layer on the resulting solidified layer, followed by similarly irradiating the powder layer with the light beam (see JP-T-01-502890 or JP-A-2000-73108). The three-dimensional shaped object thus obtained can be used as a metal mold in a case where inorganic powder materials such as a metal powder and a ceramic powder are used as the powder material. While on the other hand, the three-dimensional shaped object can be used as a model or replica in a case where organic powder materials such as a resin powder and a plastic powder are used as the powder material. This kind of technology makes it possible to produce the three-dimensional shaped object with a complicated contour shape in a short period of time.

The selective laser sintering method is described in detail, taking a case of the three-dimensional shaped object being manufactured on a supporting part as an example. As shown in FIG. 1, a powder layer 22 with a predetermined thickness t1 is firstly formed on a base plate for shaped object 21 (see FIG. 1(a)) and then a predetermined portion of a powder layer 22 is irradiated with a light beam to form a solidified layer 24. Then, a powder layer 22 is newly provided on the solidified layer 24 thus formed and is irradiated again with the light beam to form another solidified layer. When the formation of the solidified layer is repeatedly performed, there can be obtained the three-dimensional shaped object with a plurality of solidified layers 24 stacked integrally (see FIG. 1(b)).

PATENT DOCUMENTS

Prior Art Patent Documents

PATENT DOCUMENT 1: JP-T-01-502890
PATENT DOCUMENT 2: JP-A-2000-73108

DISCLOSURE OF THE INVENTION

Problems to be Solved by the Invention

When the three-dimensional shaped object is used as a metal mold, such three-dimensional shaped object is required to have a vent function for discharging a gas generated during a molding process. More specifically, the three-dimensional shaped object, which is to be used as the metal mold, is required to have a gas vent for discharging an air present in a resin supply path, and also for discharging a gas or the like generated from a molten resin raw material.

Such gas vent can be provided by forming a low-density portion in the three-dimensional shaped object (see FIG. 16). However, such low-density portion may bring about a roughened surface of a molded article. In other words, due to the fact that the low-density portion of the shaped object possesses pores (for example, diameter of each pore being in the range of 50 μm to 500 μm), there is a possibility that contour shapes of pores are transferred to the surface of the molded article. It is conceived to increase a density of the vent portion in order to reduce an occurring of the pores. However, this leads to an insufficient amount of gas flow, making it impossible to achieve a satisfactory vent effect.

Therefore, there is occurred a trade-off problem between the surface profile of the molded article (i.e., pore-transferring problem) and the vent function.

Under these circumstances, the present invention has been created. That is, an object of the present invention is to provide a three-dimensional shaped object capable of being used as a metal mold which can suitably cope with both of the surface profile issue of the molded article (i.e., pore-transferring problem) and the issue of the vent function.

Means for Solving the Problems

In order to achieve the above object, the present invention provides a method for manufacturing a three-dimensional shaped object, comprising the steps of:

(i) forming a solidified layer by irradiating a predetermined portion of a powder layer with a light beam, thereby allowing sintering of the powder of the predetermined portion or melting and subsequent solidification thereof; and (ii) forming another solidified layer by newly forming a powder layer on the resulting solidified layer, and then irradiating another predetermined portion of the new powder layer with the light beam, the steps (i) and (ii) being repeatedly performed, wherein the three-dimensional shaped object is manufactured such that it has three different solidified portions of high density, intermediate density and low density in at least a part of the object, and wherein the intermediate-density solidified portion is formed to be located in a part of the surface of the three-dimensional shaped object.

In a preferred embodiment, the intermediate-density solidified portion is formed such that it has the solidified density of 70% to 90%.

In another preferred embodiment, the intermediate-density solidified portion and the low-density solidified portion are formed to be located next to each other so that a gas can pass through the intermediate-density and low-density solidified portions.

In still another preferred embodiment, the intermediate-density portion is formed in such a step-by-step manner that a plurality of light beam irradiations are performed. It is preferred in this embodiment that an irradiation energy density of the light beam irradiations is stepwise decreased. It is also preferred that a new powder material is supplied to a region to be irradiated at a point in time between one of the light beam irradiations and the subsequent light beam irradiation. It is also preferred that, prior to the supply of the new powder material, the surface of the irradiated region by the one of the light beam irradiations is subjected to a machining process so that the irradiated region becomes to have a predetermined height. Upon the supply of the new powder material, the irradiated region by the one of the light beam irradiations and/or the powder material may be subjected to a vibration.

The present invention also provides a three-dimensional shaped object obtained by the aforementioned manufacturing method. Such three-dimensional shaped object of the present invention is used as a core metal mold or a cavity metal mold, wherein at least apart of the core metal mold or the cavity metal mold has three different solidified portions of high density, intermediate density and low density, and wherein the intermediate-density solidified portion is provided in at least a part of a cavity-forming surface of the core metal mold or the cavity metal mold.

In a preferred embodiment, the thickness of the intermediate-density solidified portion is in the range of 0.05 mm to 5 mm.

In another preferred embodiment, a pore size of the intermediate-density solidified portion is 50 μm or less.

In still another preferred embodiment, the intermediate-density solidified portion and the low-density solidified portion are located next to each other, and thereby a gas vent of the core metal mold or the cavity metal mold is provided.

Effect of Invention

The three-dimensional shaped object obtained by the manufacturing method of the present invention has the intermediate-density solidified portion formed in the surface thereof. Especially, the intermediate-density solidified portion is located side by side with the low-density solidified portion. Accordingly, the three-dimensional shaped object according to the present invention allows the gas to pass through the intermediate-density solidified portion while being provided with relatively small pores in the surface thereof. This means that the three-dimensional shaped object used as a metal mold makes it possible to not only discharge an air or gas through the intermediate-density solidified portion, but also reduce the pore-transferring problem in which the contour shapes of pores are transferred to the surface of the molded article. It should be noted that the air may be present in a supply line for resin raw material, and also the gas may be generated in the melted resin raw material.

Therefore, the present invention can cope with both of the surface profile issue of the molded article (i.e., pore-transferring problem) and the issue of the vent function.

Further in accordance with the present invention, a fluid resistance occurred upon the gas passing through the solidified portion can be suitably controlled, and also the pore size of the shaped object can be controlled by adjusting the thickness or solidified density of the intermediate-density solidified portion. Therefore, the present invention can optimally adjust the gas vent function and transferring phenomenon according to the molding conditions and the kind of molding materials, which leads to a larger flexibility (i.e., design flexibility) in terms of the resin molding process. For example in a case where an injection molding process is performed using a low-viscosity resin material (i.e., under such a condition that the contour shapes of pores are likely to be transferred to the surface of the molded article), it is better to increase the solidified density of the intermediate-density solidified portion to decrease the pore size while achieving a thinness of the intermediate-density solidified portion.

BRIEF DESCRIPTION OF THE DRAWINGS

FIGS. 1(a) and 1(b) are sectional views schematically showing operations of a laser-sintering/machining hybrid machine.

FIGS. 2(a) and 2(b) are perspective views schematically illustrating a device for performing a laser sintering (i.e., selective laser sintering method) wherein FIG. 2(a) especially shows a hybrid device with a machining mechanism, and FIG. 2(b) especially shows a device with no machining mechanism.

FIGS. 7(a) and 7(b) are schematic views showing a general concept of the present invention wherein FIG. 7(a) illustrates a cross sectional view schematically showing a three-dimensional shaped object obtainable by a manufacturing method of the present invention, and FIG. 7(b) illustrates a cross sectional view schematically showing an embodiment of the three-dimensional shaped object used as the metal mold with a gas vent function.

FIGS. 8(a) to 8(c) are sectional views schematically showing the three-dimensional shaped object obtainable by the manufacturing method of the present invention.

FIG. 10 is a schematic sectional view showing embodiments over time wherein the intermediate-density portion is formed in such a step-by-step manner that a plurality of light beam irradiations are performed, especially showing embodiments wherein a new powder material is supplied (FIG. 10(a): One of the light beam irradiations, FIG. 10(b): Supply of new powder material, FIG. 10(c): Subsequent light beam irradiation).

FIGS. 11 (a) to 11(c) are schematic sectional views showing embodiments over time wherein the intermediate-density portion is formed in such a step-by-step manner that a plurality of light beam irradiations are performed, especially showing embodiments wherein the surface of the irradiated region is subjected to a machining process (FIG. 11(a): One of the light beam irradiations, FIG. 11(b): Surface machining of irradiated region, FIG. 11(c): Subsequent light beam irradiation).

FIGS. 12 (a) to 12(c) are schematic sectional views showing embodiments over time wherein the intermediate-density portion is formed in such a step-by-step manner that a plurality of light beam irradiations are performed, especially showing embodiments wherein the irradiated region and/or the powder material are/is subjected to a vibration process (FIG. 12(a): One of the light beam irradiations, FIG.

12(b): Vibration treatment of irradiated region and/or powder material, FIG. 12(c): Subsequent light beam irradiation).

FIGS. 13(a) and 13(b) are schematic sectional views showing an embodiment wherein the intermediate-density portion is used for an application of gas pressure.

FIG. 15 is a result of a confirmatory test on transfer phenomenon of pore contour shapes.

FIG. 16 is a photograph and a schematic view, showing an embodiment of a gas vent of three-dimensional shaped object (Prior Art).

Figure 3:
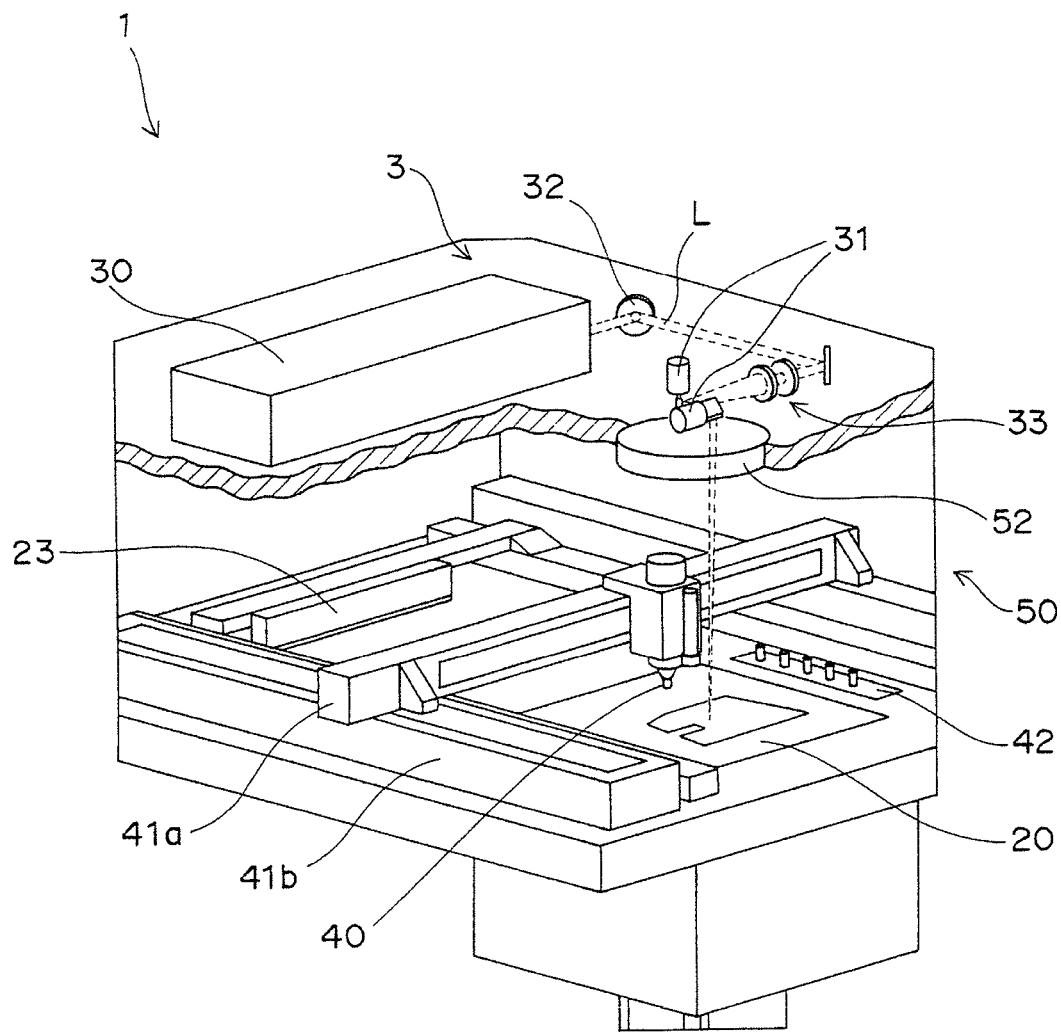
FIG. 3 is a perspective view schematically showing an embodiment in which a selective laser sintering method is carried out.

In the drawings, the reference numerals correspond to the following elements:
1 Laser-sintering/machining hybrid machine
2 Powder layer forming means
3 Light-beam irradiation means
4 Machining means
8 Fume
19 Powder/powder layer (e.g., metal powder/metal powder layer)
20 Forming table (supporting part for shaped object)
21 Base plate (base plate for shaped object)
22 Powder layer (e.g., metal powder layer or resin powder layer)
22' Powder layer or partially sintered layer irradiated by stepwise irradiation of light beam.
23 Squeegee blade
24 Solidified layer (e.g., sintered layer)
24b Intermediate-density solidified layer (e.g., intermediate-density sintered layer)
24a Intermediate-density solidified layer (e.g., intermediate-density sintered layer)
24c Low-density solidified layer (e.g., low-density sintered layer)
24d Hollow portion
25 Powder table
26 Wall of storage tank for powder material
27 Wall of forming tank
28 Storage tank for powder material
29 Forming tank
30 Light beam generator
31 Galvanometer mirror
40 Milling head
41 X-Y actuator
50 Chamber
52 Window or lens for transmission of light
L Light beam
100 Three-dimensional shaped object
200 Molded article or raw resin material

MODES FOR CARRYING OUT THE INVENTION

The present invention will be hereinafter described in more detail with reference to the accompanying drawings.

As used in this description and claims, the term "powder layer" substantially means "metal powder layer made of a metal powder", for example. Also, the term "predetermined portion of a powder layer" substantially means a portion of a three-dimensional shaped object to be manufactured. Therefore, a powder existing in such predetermined portion is irradiated with a light beam, whereby the powder undergoes a sintering or a melting and subsequent solidification thereof to form a shape of the three-dimensional shaped object. Furthermore, the term "solidified layer" substantially means "sintered layer" and the term "solidified density" substantially means "sintered density" in a case where the powder layer is a metal powder layer.

[Selective Laser Sintering Method]

Figure 4:
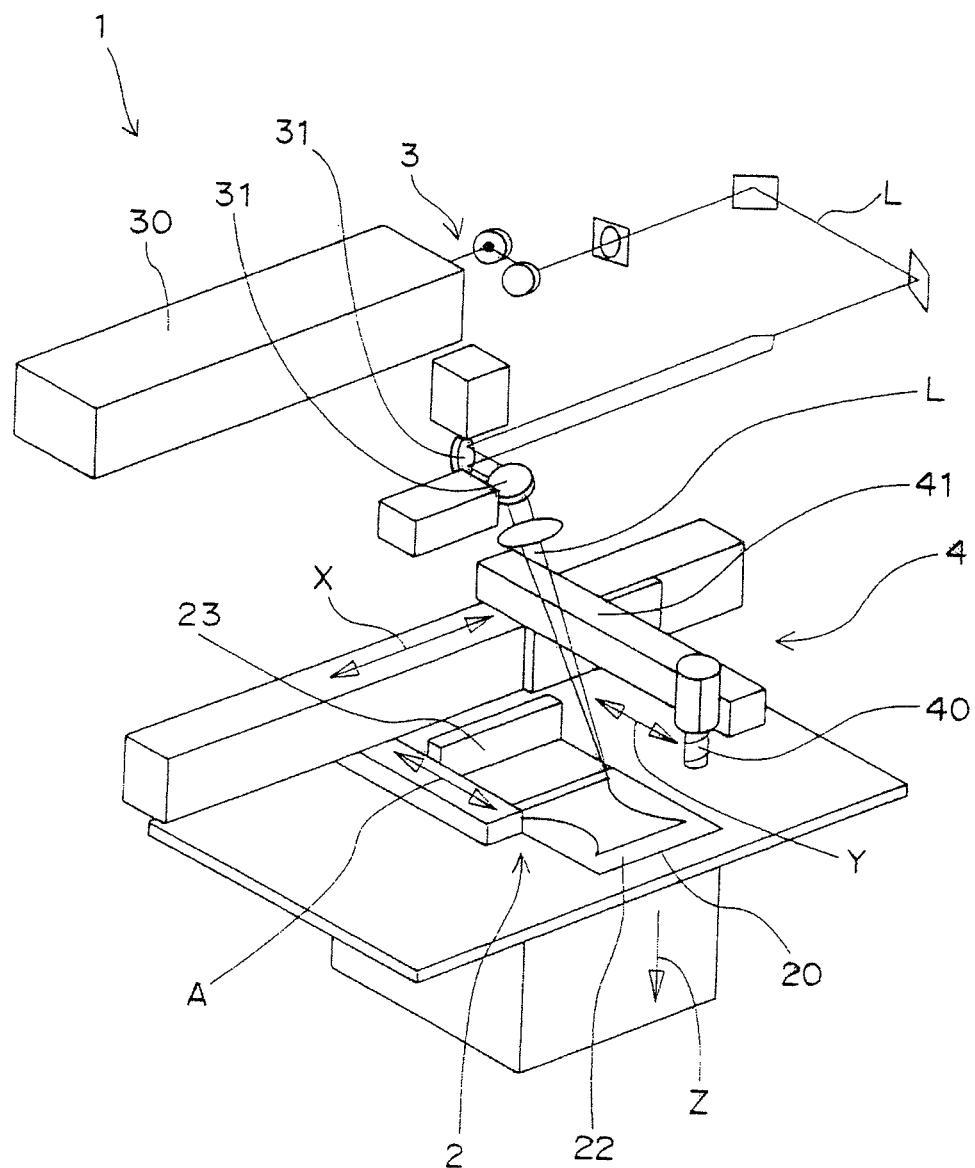
FIG. 4 is a perspective view schematically showing a constitution of a laser-sintering/machining hybrid machine by which a selective laser sintering method is carried out.

First, a selective laser sintering method, on which the manufacturing method of the present invention is based, will be described. For convenience, the selective laser sintering method, which will be described, is one where powder material is supplied from a storage tank therefor, followed by being flattened by means of a squeegee blade to form a powder layer therefrom. Moreover, by way of example, the selective laser sintering method wherein a machining process is additionally carried out with respect to the shaped object (i.e., the method embodiment shown in FIG. 2(a), not FIG. 2(b)) will be described. FIGS. 1, 3 and 4 show functions and constitutions, which enable execution of the selective laser sintering method, of a laser-sintering/machining hybrid machine. The laser-sintering/milling hybrid machine 1 is mainly provided with a "powder layer forming means 2 for forming a powder layer by providing a powder such as a metal powder or a resin powder in a predetermined thickness"; a "forming table 20 which is capable of vertically elevating/descending by cylinder drive in a forming tank 29 whose outer periphery is surrounded with a wall 27"; a "base plate for shaped object 21 which is disposed on the forming table 20 and serves as a platform of a shaped object"; a "light-beam irradiation means 3 for irradiating a desired position with an emitted light beam L"; and a "machining means 4 for milling the periphery of a shaped object". As shown in FIG. 1, the powder layer forming means 2 is mainly composed of a "powder table 25 capable of vertically elevating/descending by cylinder drive in a storage tank for powder material 28 whose outer periphery is surrounded with a wall 26" and a "squeegee blade 23 for forming a powder layer 22 on a base plate for shaped object or forming table". As shown in FIG. 3 and FIG. 4, the light-beam irradiation means 3 is mainly composed of a "light beam generator 30 for emitting a light beam L" and a "galvanometer mirror 31 (scan optical system) for scanning a light beam L onto a powder layer 22". Optionally, the light-beam irradiation means 3 is equipped with a beam shape correcting means for correcting a shape of a light beam spot (e.g., a means composed of a pair of cylindrical lens and a rotation drive mechanism for rotating the lens around a shaft line of the light beam) and fθ lens. The machining means 4 is mainly composed of a "milling head 40 for milling the periphery of a shaped object" and an "X-Y actuator 41 (41a, 41b) for driving the milling head 40 to move toward the position to be milled" (see FIG. 3 and FIG. 4).

Figure 5:
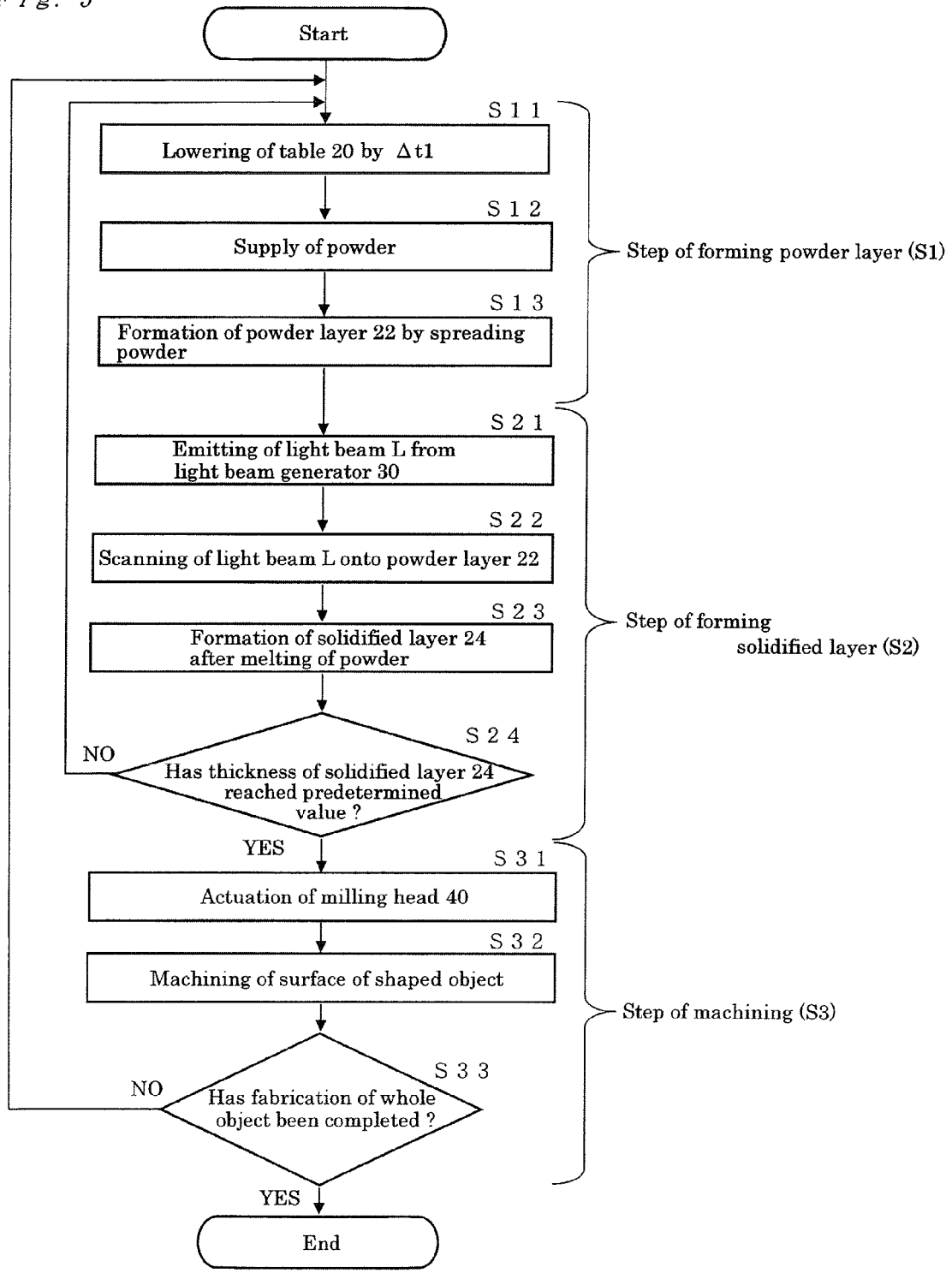
FIG. 5 is a flow chart of operations of a laser-sintering/machining hybrid machine.
Figure 6:
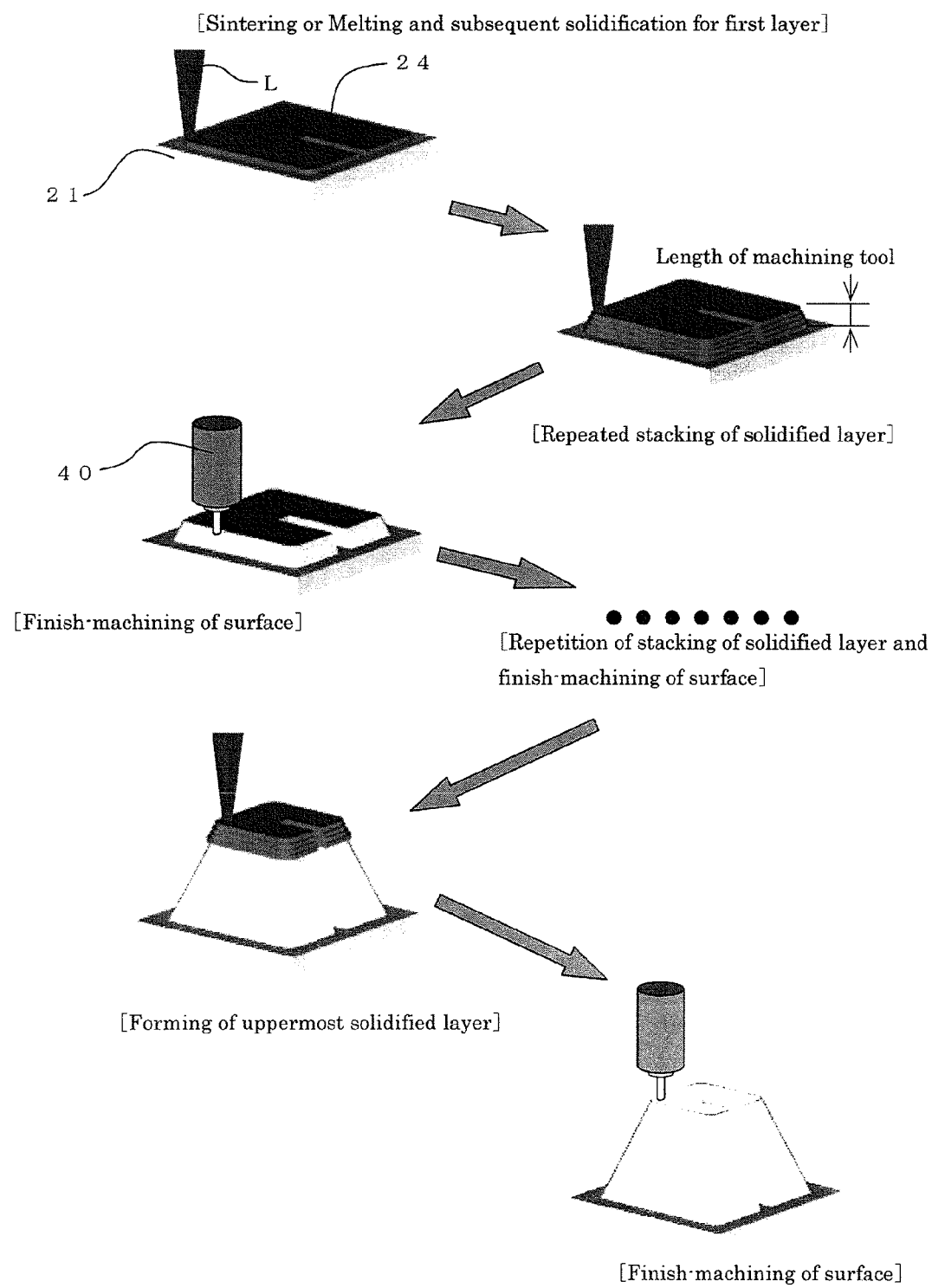
FIG. 6 is a schematic view showing a laser-sintering/machining hybrid process over time.

Operations of the laser-sintering/machining hybrid machine 1 will be described in detail with reference to FIG. 1, FIG. 5 and FIG. 6. FIG. 5 shows a general operation flow of a laser-sintering/machining hybrid machine. FIG. 6 schematically and simply shows a laser-sintering/machining hybrid process.

The operations of the laser-sintering/machining hybrid machine are mainly composed of a powder layer forming step (S1) of forming a powder layer 22; a solidified layer forming step (S2) of irradiating the powder layer 22 with a light beam L to form a solidified layer 24; and a machining step (S3) of milling a surface of a shaped object. In the powder layer forming step (S1), first, the forming table 20 is descended by Δt1 (S11). Subsequently, a powder table 25 is elevated by Δt1, and thereafter the squeegee blade 23 is driven to move in the direction of arrow "A" as shown in FIG. 1(a). Whereby, a powder (e.g., an "iron powder having a mean particle diameter of about 5 μm to 100 μm" or a "powder having a mean particle diameter of about 30 μm to 100 μm, such as a powder of nylon, polypropylene or ABS") placed on the powder table 25 is spread to form a powder layer 22 in a predetermined thickness Δt1 (S13), while being transferred onto the base plate 21 (S12). Following this step, the solidified layer forming step (S2) is performed. In this the solidified layer forming step, a light beam L (e.g., carbon dioxide gas laser (500 W), Nd:YAG laser (500 W), fiber laser (500 W) or ultraviolet light) is emitted from the light beam generator 30 (S21) and then a light beam L is scanned onto a desired position of the powder layer 22 by means of the galvanometer mirror 31 (S22). The scanned light beam can cause the powder to be melted and solidified, resulting in a formation of the solidified layer 24 integrated with the base plate 21 (S23). There is not limitation on transmission of the light beam in air, and the light beam may also be transmitted through an optical fiber or the like.

The powder layer forming step (S1) and the solidified layer forming step (S2) are repeatedly performed until the thickness of the stacked layers 24 reaches such a predetermined value that is obtained based on a tool length of the milling head 40 (see FIG. 1(b)). Upon a sintering of the powder or a melting and subsequent solidification of the powder, the newly stacked solidified layer is integrated with the lower solidified layer which has already been formed.

When the thickness of the stacked solidified layers 24 reaches a predetermined thickness, the machining step (S3) is initiated. In the embodiments as shown in FIG. 1 and FIG. 6, the milling head 40 is actuated to initiate execution of the machining step (S31). For example, in a case where the tool (ball end mill) of the milling head 40 has a diameter of 1 mm and an effective milling length of 3 mm, a milling in a depth of 3 mm can be performed. Therefore, when Δt1 is 0.05 mm, the milling head 40 is actuated when sixty solidified layers are formed. The milling head 40 is moved in X and Y directions by means of the X-Y actuator 41 (41a, 41b) and the shaped object composed of stacked solidified layers 24 is subjected to the surface machining (S32). When the entire three-dimensional shaped object has not yet been manufactured, the step returns to the powder layer forming step (S1). Thereafter, the steps S1 through S3 are repeatedly performed to further stack the solidified layers 24, and thereby making it possible to manufacture the desired three-dimensional shaped object (see FIG. 6).

An irradiation path of the light beam L in the solidified layer forming step (S2) and a milling path in the machining step (S3) are determined in advance using 3-D CAD data. In this case, the machining path is determined by applying contour line processing. For example, in the solidified layer forming step (S2), the contour shape data of each of sliced sections, which are regularly-pitched (e.g., 0.05 mm pitch when Δt1 is 0.05 mm) sliced sections of STL data produced from a 3-D CAD model, are used.

[Manufacturing Method of the Present Invention]

The present invention is particularly characterized by a forming process of a solidified layer in the above described selective laser sintering method. Specifically, at least three different solidified portions which respectively have different solidification densities (i.e., different bulk densities) are formed in the manufacturing process of the three-dimensional shaped object 100. That is, a high-density solidified portion 24a, an intermediate-density solidified portion 24b and a low-density solidified portion 24c are formed as shown in FIG. 7(a). In particular, the intermediate-density solidified portion 24b is formed such that it is exposed at a surface region of the shaped object.

Preferably, the intermediate-density solidified portion 24b is formed such that it has the solidified density of about 70% to about 90%. In the present invention, a portion with a higher solidified density than the solidified density $d_{intermediate-density}$ of the intermediate-density solidified portion corresponds to the high-density solidified portion 24a. While on the other hand, a portion with a lower solidified density than the solidified density $d_{intermediate-density}$ of the solidified portion corresponds to the low-density solidified portion 24c. Therefore, in a case where the solidified density of the intermediate-density solidified portion 24b ranges from 70% to 90%, the solidified density of the high-density solidified portion 24a can range from 90% (excluding 90%) to 100%. While on the other hand, the solidified density of the low-density solidified portion 24c can range from 40% to 70% (excluding 70%).

With respect to a pore size (i.e., dimension of pore) of the solidified portions 24a-24c, it tends to become smaller when the portion has a higher solidified density, whereas it tends to become larger when the portion has a lower solidified density. It is preferred that the pore size (average pore dimension) of the intermediate-density solidified portion 24b is in the range of 5 μm to 50 μm. Thus, the pore size (average pore dimension) of the low-density solidified portion 24c can be in the range of 50 μm (excluding 50 μm) to 500 μm, whereas the pore size (average pore dimension) of the high-density solidified portion 24a can be in the range of 0.1 μm and 5 μm (excluding 5 μm).

It is preferred that the low-density solidified portion 24c is formed next to the intermediate-density solidified portion 24b such that they are connected to each other, making it possible for the intermediate-density portion 24b to serve as a gas passage allowing a gas to pass therethrough (see FIG. 7(b)). Such arrangement of the low-density solidified portion 24c can contribute to a decrease in the thickness of the intermediate-density solidified portion 24b, which leads to an effective decrease in a fluid resistance occurred upon passing of the gas through the solidified density. Further, as shown in FIG. 7(b), a hollow portion 24d (i.e., hollow space) may be formed such that the hollow portion 24d communicates with the low-density solidified portion 24c. As shown in FIG. 7(b), it is preferred that the hollow portion 24d is formed to be located behind the low-density solidified portion 24c such that the hollow portion 24d communicates with the outside of the shaped object.

In a case where the three-dimensional shaped object 100 as shown in FIGS. 7(a) and 7(b) is used as a metal mold for resin molding, an air, a gas and the like can be discharged from the metal mold via the intermediate-density solidified portion 24b and the low-density solidified portion 24c, such air being present in a resin supply path and such gas or the like being generated from a molten resin material. Therefore, the intermediate-density solidified portion 24b and the low-density solidified portion 24c can suitably serve as a gas vent of the metal mold.

The present invention will be further described with reference to the attached drawings. The metal powder used in the present invention may be a powder containing an iron based powder as a main component, and may be a powder which further contains at least one kind powder selected from the group consisting of a nickel powder, a nickel based alloy powder, a copper powder, a copper based alloy powder and a graphite powder in some cases. Examples of the metal powder include a metal powder in which the proportion of an iron based powder having a mean particle diameter of about 20 μm is 60 to 90% by weight, the proportion of both or either of a nickel powder and a nickel based alloy powder is 5 to 35% by weight, the proportion of both or either of a copper powder and/or a copper based alloy powder is 5 to 15% by weight, and the proportion of a graphite powder is 0.2 to 0.8% by weight. The metal powder is not particularly limited to the iron based powder, but copper based powder or aluminum powder may be used. Moreover, plastic powder or ceramic powder may also be used as long as the three-dimensional shaped object is used not as a metal mold, but as a pressing part.

In the manufacturing method of the present invention, a step of forming a metal powder layer 22 with its predetermined thickness on a base plate 21 and a step of irradiating a predetermined portion of the metal powder layer 22 with a light beam to form a sintered layer from the irradiated portion of the metal powder layer (see, FIGS. 1(a) and 1(b)) are repeated. During such repeated steps, the three portions having different sintered densities from each other are formed for example by adjusting the irradiation energy of the light beam. That is, three different portions of the high-density sintered portion 24a (i.e., high-density sintered region), the intermediate-density sintered portion 24b (i.e., intermediate-density sintered region) and the low-density sintered portion 24c (i.e., low-density sintered region) are formed by adjusting the irradiation energy of the light beam.

More specifically, when the irradiation energy of the light beam to be applied to a powder region is relatively decreased, there can be formed the low-density sintered portion 24c. While on the other hand, when the irradiation energy of the light beam to be applied to the powder region is relatively increased, there can be formed the high-density sintered portion 24a. Accordingly, when the powder region is irradiated with the light beam having an energy between "irradiation energy for the low-density sintered portion 24c" and "irradiation energy for the high-density sintered portion 24a", there can be formed the intermediate-density sintered portion 24b. For example, the high-density sintered portion 24a (whose sintered density of 90% to 100%) can be formed when the light beam with irradiation energy density E of about 8 J/mm² to about 15 J/mm² is used. The low-density sintering portion 24c (whose sintered density of 40% to 70%) is formed when the light beam with irradiation energy density E of about 1 J/mm² to about 3.5 J/mm² is used. The intermediate-density sintered portion 24b (whose sintered density of about 70% to about 90%) is formed when the light beam with irradiation energy density E of about 4 J/mm² to about 7 J/mm² is used. It should be noted that Energy density E=Laser output power (W)/(Scanning rate (mm/s)×Scanning pitch (mm)) wherein the manufacturing condition is as follows: Powder layer thickness: 0.05 mm, Laser; $CO_2$ Laser (Carbon dioxide laser), Spot diameter: 0.5 mm. It should be also noted that the above values of the irradiation energy densities E for forming the high-density sintered portion 24a, the intermediate-density sintered portion 24b and the low-density sintered portion 24c are for the purposes of illustration and not limitation, and thus can vary depending on a kind of powder materials for the powder layers.

As used in this description and claims, the term "sintered density (%)" substantially means a sintered sectional density (occupation ratio of a metallic material) determined by image processing of a sectional photograph of the shaped object. Image processing software for determining the sintered sectional density is Scion Image ver. 4.0.2 (freeware). In such case, it is possible to determine a sintered sectional density $\rho_s$ from the below-mentioned equation 1 by binarizing a sectional image into a sintered portion (white) and a vacancy portion (black), and then counting all picture element numbers $Px_{all}$ of the image and picture element number $PX_{white}$ of the sintered portion (white).

$$\rho_S = \frac{Px_{white}}{Px_{all}} \times 100\,(\%) \qquad \text{[Equation 1]}$$

The three different solidified portions which respectively have different solidification densities from each other can be formed by, in addition to (a) controlling the irradiation energy of the light beam (e.g., controlling the output energy of the light beam), (b) controlling a scanning rate of the light beam, (c) controlling a scanning pitch of the light beam, and (d) controlling a condensing diameter of the light beam. For example, a higher sintered density can be achieved by, in addition to (a) increasing the output energy of the light beam, (b) decreasing the scanning rate of the light beam, (c) decreasing the scanning pitch of the light beam, and (d) decreasing the condensing diameter of the light beam. While on the other hand, a lower sintered density can be achieved by, in addition to (a) decreasing the irradiation energy of the light beam (e.g., decreasing the output energy of the light beam), (b) increasing the scanning rate of the light beam, (c) enlarging the scanning pitch of the light beam, and (d) increasing the condensing diameter of the light beam. The aforementioned operations (a) to (d) may be performed alone, or performed in combination.

The intermediate-density sintered portion 24b thus formed has the sintered density of 70% to 90% which allows a gas to pass therethrough. As a result, the intermediate-density sintered portion 24b suitably serves as a gas vent of a metal mold, especially when the intermediate-density sintered portion 24b is used in combination with the low-density sintered portion 24c. The pore size of the intermediate-density sintered portion 24b is relatively small. That is, the pore size of the intermediate-density sintered portion 24b is in the approximate range of 5 μm to 50 μm. Therefore, even if the shaped object has the intermediate-density sintered portion 24b in the surface thereof (i.e., in a cavity-forming surface of the metal mold, the contour shapes of the pores are less likely to be transferred to the surface of the molded article.

The combination of the intermediate-density sintered portion 24b and the low-density sintered portion 24c is not particularly limited as long as the intermediate-density sintered portion 24b and the low-density sintered portion 24c allow the gas to pass therethrough. For example, the embodiments as shown in FIGS. 8(a) to 8(c) are possible with respect to the combination of the intermediate-density sintered portion 24b and the low-density sintered portion 24c. As seen from FIGS. 8(a) to 8(c), it is preferred that the intermediate-density solidified portion 24b and the low-density solidified portion 24c are formed to be located next to each other such that the intermediate-density solidified portion 24b and the low-density solidified portion 24c are directly connected with each other. In other words, the intermediate-density solidified portion 24b is formed to be exposed at the cavity-forming surface of the metal mold (i.e., at an inner wall surface of the metal mold, such inner wall surface being used for forming the molded article), and also the low-density sintered portion 24c is formed to be located behind the intermediate-density solidified portion 24b. Such configuration of the intermediate-density and low-density sintered portions 24b, 24c allows the gas of a cavity space of the metal mold to be discharged through the intermediate-density solidified portion 24b and subsequently through the low-density sintered region 24c. This results in a discharge of the gas from the cavity space of the metal mold to the outside thereof. It is preferred that the high-density solidified portion 24a is formed such that the combination of the intermediate-density sintered portion 24b and the low-density sintered portion 24c is surrounded by the high-density solidified portion 24a. In order to allow the combination of the intermediate-density sintered region 24b and the low-density sintered region 24c to suitably serve as a gas vent, the hollow portion 24d which communicates with the outside of the shaped object may be formed to be located behind the low-density sintered portion 24c (see FIG. 8).

In order to decrease a "fluid resistance upon passing of the gas", it is preferred that the intermediate-density sintered portion 24b is formed such that it has a relatively thin form. In other words, it is preferable to achieve a small thickness dimension of the intermediate-density sintered portion 24b in order to minimize a pressure loss caused during the gas passage through the intermediate-density sintered portion 24b while still providing a required strength of the portion. That is, it is preferable to form the thin intermediate-density sintered portion 24b. For example, the thickness $t_b$ (see FIG. 7(b)) of the intermediate-density sintered portion 24b is preferably in the range of 0.05 mm to 5 mm, more preferably in the range of 0.1 mm to 3 mm. It is also preferable to form the thin low-density sintered portion 24c in order to reduce the "fluid resistance upon passing of the gas". However, the low-density sintered portion 24c requires its thickness to a certain level, since it also serves to make up for the decrease in the strength of the intermediate-density sintered portion 24b. For example, the thickness $t_c$ (see FIG. 7(b)) of the low-density sintered portion 24c is larger than the thickness $t_b$ of the intermediate-density sintered portion 24b. The thickness $t_c$ is preferably in the range of 0.5 mm to 10 mm, more preferably in the range of 2.5 mm to 5 mm.

(Preferable Forming Embodiment of Intermediate-Density Sintered Portion)

A preferable embodiment regarding the formation of the intermediate-density sintered portion will be described. It is preferred that the intermediate-density portion 24b is formed in such a step-by-step manner that a plurality of light beam irradiations are performed. In other words, the intermediate-density sintered portion is formed by step-by-step applying the light beam with low energy to the powder layer in a plurality of times, not by applying the light beam at one time. This makes it possible to form the intermediate-density sintered portion having smaller pore size and thus providing an improved strength of the portion. The step-by-step irradiation of the light beam in a plurality of times can also improve a uniformity of the pore size of the intermediate-density sintered portion, and thereby the contour shapes of the pores becomes less likely to be transferred to the surface of the molded article in a case of the same sintered density.

Figure 9:
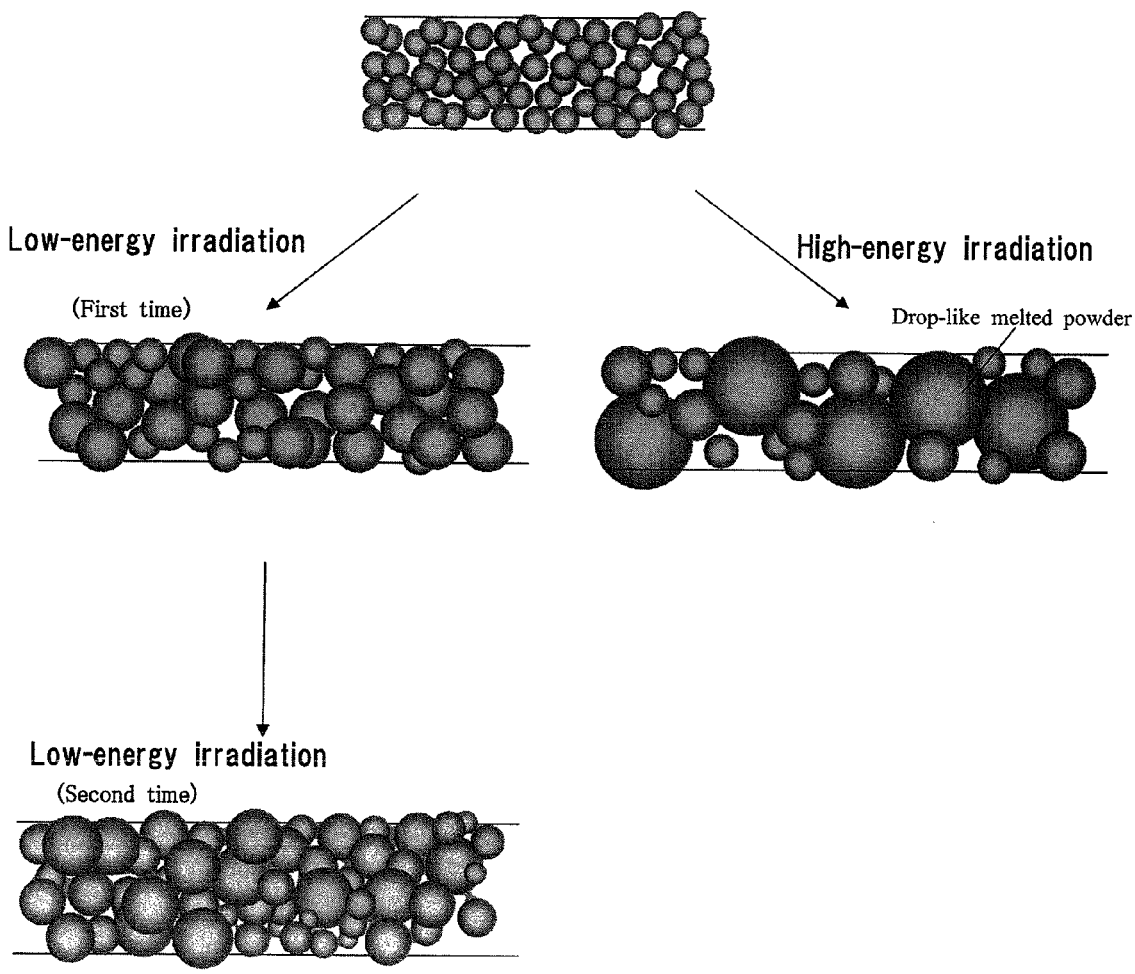
FIG. 9 is a schematic view for explaining a preferred embodiment in which an intermediate-density solidified portion is formed.

For example in a case where the low-density sintered layer is formed by irradiating the powder layer with the light beam having low energy, and thereby allowing the sintering of the powder of the powder layer, the resulting layer locally includes highly molten portions where the powder has been highly molten and less molten portions where the powder has been less molten. Upon the application of the energy, the powder melts to get together, thereby forming molten powder droplets. Subsequently, when the powder droplets are subjected to cooling, the neighboring molten powder droplets stick together. The low energy causes the molten powder droplets to become smaller, but to have less adhesion strength with respect to the formerly formed layer (see the left side of FIG. 9). The molten powder droplets tend to be larger at higher energy. However, the higher energy causes the sizes of molten powder droplets to vary, which leads to larger void spaces between molten powder droplets (see the right side of FIG. 9). As the void spaces between the molten powder droplets become larger, the pores of the surface become larger. Therefore, as shown in the left side of FIG. 9, the powder layer is irradiated with a light beam under such a conditions that the first light beam irradiation is performed to make the molten powder droplets relatively small and the sintering almost uniform, and the second light beam irradiation is performed to improve a binding between the molten powder droplets to thereby increase the adhesion strength. This results in an improved strength of the sintered layer with smaller pores.

With respect to "a plurality of light beam irradiation" for forming the intermediate-density sintered portion 24b, the light beam irradiation is performed preferably 2 to 8 times, more preferably 2 to 6 times, still more preferably 2 to 4 times. In this step-by-step irradiation performed at a plurality of times, it is preferred that an irradiation energy is stepwise decreased. The reason for this is that an energy absorption rate of the light beam becomes smaller as a particle diameter of the powder becomes smaller and, on and after the second irradiation, only the molten powder droplets which are made smaller due to the first irradiation and the subsequent sintering are further subjected to re-sintering. In other words, in a case of the plurality of the light beam irradiations wherein the irradiation energy density is stepwise decreased, it is preferred that a predetermined portion of the powder layer is gradually solidified while reducing the pores (namely it is not preferred that the predetermined portion of the powder layer is solidified at one time) For example, the light beam irradiations whose energy density E is decreased by about 0.2 J/mm² to about 1 J/mm² in each step may be performed for a plurality of times, thereby enabling the step-by-step solidification.

While performing the plurality of light beam irradiations, a new powder material may be supplied at a point in time between one of the light beam irradiations and the subsequent one (see FIG. 10). In so doing, the void spaces between molten powder droplets generated by the prior light beam irradiation are filled with the supplied powder, followed by being subjected to the sintering process. This will lead to a suitable formation of the intermediate-density sintered portion 24b which has smaller pores and thus has higher strength. For example, in a case where the powder material is supplied after the first light beam irradiation, followed by the subsequent second light beam irradiation, an amount of the supplied powder material may be determined based on an original volume of the powder layer (i.e., a original bulk volume of the powder layer, the bulk volume being regarded as having the volume of the void space), for example. The amount of powder to be supplied may be preferably in the approximate range of 1 vol % to 30 vol %, more preferably in the approximate range of 2 vol % to 15 vol %.

With respect to the plurality of light beam irradiations, a machining process may be performed. Specifically, prior to the supply of the new powder, the surface of the irradiated region by the one of the light beam irradiations may be subjected to a machining process so that the irradiated region becomes to have a predetermined height (see FIG. 11). The reason for this is that the previous light beam irradiation (e.g., the first light beam irradiation) may cause the irradiated region to have an undesirable height, and thus a powder supply mechanism (e.g., squeegee blade) was inhibited by such undesirable height of the irradiated region upon supplying of the powder material. Therefore, such surface machining process with respect to the already irradiated region makes it possible to suitably form the intermediate-density sintered portion 24b having smaller pores and thus having a higher strength. For example, at a point time after the first light beam irradiation is performed, the surface of the sintered layer may be subjected to the machining process such that the sintered layer formed by the first light beam irradiation has the predetermined height, especially it has "predetermined height" as a whole. Any suitable means can be used in the machining process as long as it can provide a surface cutting process. For example, the means for the machining process of the above described metal laser sintering hybrid milling machine can be used. In other words, the used machining means may be a numerical control (NC: Numerical Control) machine tool or those analogous thereto. More specifically, the surface machining means is preferably a machining center (MC) whose milling tool (end mill) is automatically exchangeable. As the milling tool, a square end mill, a radius end mill or the like may also be used as necessary.

Moreover, the irradiated region formed by the previous light beam irradiation may be subjected to a vibration process. Alternatively or additionally, the powder material may also be subjected to the vibration process. See FIG. 12. Such vibration process allows the powder material to easily enter the void spaces between the molten powder droplets. As a result, there can be efficiently obtained the intermediate-density layer with smaller pores and thus the higher strength. For example, the vibration process of the irradiated region and the powder material is performed by driving a vibration means (e.g., an ultrasonic transducer) mounted on a squeegee blade 23 and/or a forming table 20. The frequency of vibration may be set to any suitable one as long as it can facilitate the supply of the powder to the void spaces between the molten powder droplets.

[Three-Dimensional Shaped Object of the Present Invention]

The three-dimensional shaped object of the present invention obtained by the above manufacturing method will be now described. The three-dimensional shaped object of the present invention can be used as a metal mold of the core side or the cavity side wherein at least a part of the core metal mold or cavity metal mold has three different solidified portions of high density, intermediate density and low density. In particular, the intermediate-density solidified portion is provided in at least a part of a cavity-forming surface of the core metal mold or the cavity metal mold. Therefore, when a resin molding process is performed using the three-dimensional shaped object of the present invention as a metal mold, an air, a gas and the like can be discharged from the metal mold via the intermediate-density solidified portion 24b, such air being present in a resin supply path and such gas or the like being generated from a molten resin material.

More specific embodiments of the three-dimensional shaped object of the present invention may be modified depending on a final use thereof. In a case where the three-dimensional shaped object is used as the metal mold, the specifics of the three-dimensional shaped object of the present invention may be modified depending on a shape of the molded article. As the specific three-dimensional shaped object, the three-dimensional shaped object 100 as illustrated in FIGS. 8(a) to 8(c) can be exemplified. As seen from the embodiments of FIGS. 8(a) to 8(c), it is preferred that the intermediate-density solidified portion 24b and the low-density solidified portion 24c are located next to each other such that the intermediate-density solidified portion 24b and the low-density solidified portion 24c are directly connected to each other. In this case, the combination of the intermediate-density sintered portion 24b and the low-density sintered portion 24c can suitably serve as a gas vent of the metal mold.

The sintered density of the intermediate-density sintered portion 24b may be for example in the range of 70% to 90%. The sintered density of the high-density sintered portion 24a may be for example in the range of 90% (excluding 90%) to 100%. The sintered density of the low-density sintered portion 24c may be in the range of 40% to 70% (excluding 70%). In such case, the pore size of the intermediate-density sintered portion 24b can be in the range of 5 μm to 50 μm, the pore size of the high-density sintered portion 24a can be in the range of 0.1 μm and 5 μm (excluding 5 μm), and the pore size of the low-density sintered portion 24c can be in the range of 50 μm (excluding 50 μm) to 500 μm. As used in this description and claims, the term "pore size (i.e., a mean pore size)" substantially means a diameter of each pore (e.g., the largest diameter of the pores in all directions), the diameter of each pore being obtainable by performing an image processing based on a photograph of the cross section of the sintered portion.

The range of the pore size (i.e., pore diameter) can vary according to a kind of molding material and molding conditions. For example, in a case where a "raw resin material having a relatively low viscosity" is used for the injection molding (i.e., under such a condition that the contour shapes of pores are likely to be transferred to the surface of the molded article), it is preferable to control the pore size of the intermediate-density sintered portion 24b to fall within the approximate range of 5 μm to 10 μm. On the other hand, in a case where the "raw resin material having a relatively high viscosity" is used for the injection molding (i.e., under such a condition that the contour shapes of pores are less likely to be transferred to the surface of the molded article), the pore size of the intermediate-density sintered portion 24b may be controlled to fall within the approximate range of 10 μm to 50 μm.

As described above, it is preferred that the intermediate-density sintered portion 24b has a small thickness dimension in order to minimize the pressure loss caused during the gas passage through the intermediate-density sintered portion 24b while still providing a required strength of the portion. It is also preferable to form the thin low-density sintered portion 24c in order to reduce the "fluid resistance upon passing of the gas". However, the low-density sintered portion 24c requires its thickness to a certain level, since it also serves to make up for the decrease in the strength of the intermediate-density sintered portion 24b. For example, in a case where the thickness $t_b$ of the intermediate-density sintered portions 24b is in the range of 0.05 mm to 5 mm, the thickness $t_c$ of the low-density sintered portion 24c may be in the range of 0.5 mm to 10 mm.

Although a few embodiments of the present invention have been hereinbefore described, the present invention is not limited to these embodiments. It will be readily appreciated by those skilled in the art that various modifications are possible without departing from the scope of the present invention. For example, the following modifications are possible.

In view of the fact that the intermediate-density solidified portion serves as a gas passageway, the intermediate-density solidified portion (preferably together with the low-density solidified portion) can be used as not only a gas vent, but also a pressure application means in which the gas is applied therethrough. More specifically, in a case where the three-dimensional shaped object is used as a metal mold for resin molding, the intermediate-density solidified portion may be formed at a surface of the metal mold where a sink mark tends to appear. In this case, the gas can be supplied into a cavity from the outside via the intermediate-density solidified portion, and thereby "sink mark portion" or "portion where the sink mark tends to occur" can be pressurized by the supplied gas. As a result, an occurring of the sink mark during the resin molding process can be effectively prevented (see FIGS. 13(a) and 13(b)). Even in this case, a fluid resistance upon the gas passage can be suitably controlled by adjusting the solidified density and the thickness of the intermediate-density solidified portion (and/or the low-density solidified portion), which leads to an achievement of an adjusted pressure level in the gas application process. More specifically, the solidified density can be made lower with respect to the molded article portion where a larger applied pressure is desired (e.g., a thicker portion of the molded article), whereas the solidified density may be made higher with respect to the molded article portion where little applied pressure is desired (e.g., a thinner portion of the molded article having less strength). As a result thereof, there can be obtained a larger flexibility (i.e., design flexibility) in terms of the molding process.

It should be noted that the present invention as described above includes the following aspects:

The first aspect: A method for manufacturing a three-dimensional shaped object, comprising the steps of:

(i) forming a solidified layer by irradiating a predetermined portion of a powder layer with a light beam, thereby allowing sintering of the powder of the predetermined portion or melting and subsequent solidification thereof; and (ii) forming another solidified layer by newly forming a powder layer on the resulting solidified layer, and then irradiating another predetermined portion of the new powder layer with the light beam, the steps (i) and (ii) being repeatedly performed, wherein the three-dimensional shaped object is manufactured such that it has three different solidified portions of high-density, intermediate-density and low-density solidified portions in at least a part of the object, and wherein the intermediate-density solidified portion is formed to be located in a part of a surface portion of the three-dimensional shaped object.

The second aspect: The method according to the first aspect, wherein the intermediate-density solidified portion with its solidified density of 70% to 90% is formed.

The third aspect: The method according to the first or second aspect, wherein the intermediate-density solidified portion and the low-density solidified portion are formed to be located next to each other so that a gas can pass through the intermediate-density and low-density solidified portions.

The fourth aspect: The method according to any one of the first to third aspects, wherein the intermediate-density portion is formed in such a step-by-step manner that a plurality of light beam irradiations are performed.

The fifth aspect: The method according to the fourth aspect, wherein an irradiation energy density of the light beam irradiations is stepwise decreased.

The sixth aspect: The method according to the fourth or fifth aspect, wherein a new powder material is supplied to a region to be irradiated at a point in time between one of the light beam irradiations and the subsequent light beam irradiation.

The seventh aspect: The method according to the sixth aspect, wherein, prior to the supply of the new powder, the irradiated region by the one of the light beam irradiations is subjected to a machining process so that the irradiated region has a predetermined height.

The eighth aspect: The method according to the sixth or seventh aspect, wherein, during the supply of the new powder, the irradiated region by the one of the light beam irradiations and/or the powder material are/is subjected to a vibration.

The ninth aspect: A three-dimensional shaped object obtained by the method according to any one of the first to eighth aspects, used as a core metal mold or a cavity metal mold, wherein at least a part of the core metal mold or the cavity metal mold has three different solidified portions of high-density, intermediate-density and low-density solidified portions, and wherein the intermediate-density solidified portion is provided in at least a part of a cavity-forming surface of the core metal mold or the cavity metal mold.

The tenth aspect: The three-dimensional shaped object according to the ninth aspect, wherein a thickness of the intermediate-density solidified portion is in the range of 0.05 mm to 5 mm.

The eleventh aspect: The three-dimensional shaped object according to the ninth or tenth aspect, wherein a pore size of the intermediate-density solidified portion is 50 μm or less.

The twelfth aspect: The three-dimensional shaped object according to any one of the ninth to eleven aspects when appendant to the third aspect, wherein the intermediate-density solidified portion and the low-density solidified portion are located next to each other, and thereby a gas vent of the core metal mold or the cavity metal mold is provided.

EXAMPLES

Figure 14:
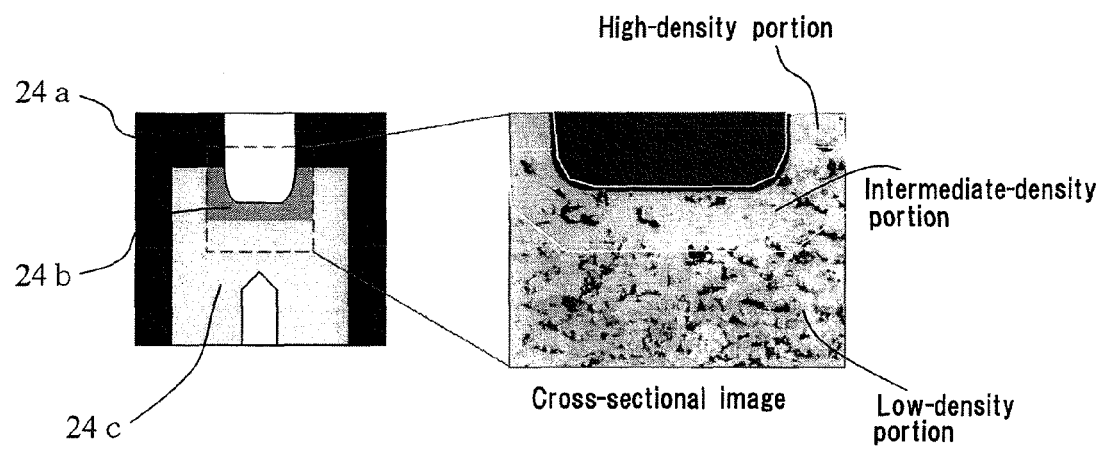
FIG. 14 is a cross sectional view and a photomicrograph regarding the three-dimensional shaped object manufactured in "EXAMPLES".

The three-dimensional shaped object as shown in FIG. 8(b) was manufactured to experimentally substantiate the present invention. The manufacturing conditions were as follows:

High-Density Sintered Layer
Irradiation energy of light beam: 10 J/mm$^2$
Sintered density: 99%
Average pore size: 3 μm
Intermediate-Density Sintered Layer
Irradiation energy of light beam: 5 J/mm$^2$
Sintered density: 85%
Average pore size: 45 μm
Forming position: Surface of the shaped object
Thickness: 1 mm
Low-density Sintered Layer
Irradiation energy of light beam: 2 J/mm$^2$
Sintered density: 69%
Average pore size: 100 μm
Forming position: Behind the intermediate-density sintered layer
Thickness: 3 mm FIG. 14 is a microphotograph showing a cross section of the three-dimensional shaped object manufactured according to the above conditions. As seen from FIG. 14, it can be confirmed that the three-dimensional shaped object had three different solidified portions of solidified densities, i.e., high density, intermediate density and low density.

(Test for Confirming Transfer Phenomenon of Pore Contour Shapes)

A confirming test was performed to see whether the transfer phenomenon of the contour shapes of pores depends on the difference in the sintered density. More specifically, the metal molds were produced such that the surfaces thereof respectively had different sintered densities, i.e., a high density (sintered density: 99%, average pore size: 3 µm), an intermediate density (sintered density: 85%, average pore size: 45 µm), and low density (sintered density: 69%, average pore size: 100 µm). By using of such metal molds, the transfer phenomenon of the contour shapes of pores was studied.

The results thereof are shown in FIG. 15. As seen from the results of FIG. 15, the sintered surface of the intermediate-density brought about a good surface profile since the pore contour shapes of the intermediate-density portion of the shaped object were less likely to be transferred to the surface of the molded article. Therefore, it can be appreciated that, even if the surface portion of the shaped object has the intermediate-density solidified portion which serves as a gas passage, no adverse effect is provided in terms of the transfer phenomenon of the molded article, which will to an achievement of a desirable molding.

INDUSTRIAL APPLICABILITY

According to the method for manufacturing a three-dimensional shaped object of the present invention as well as the three-dimensional shaped object of the present invention, various kinds of objects can be provided. For example in a case where the powder layer is a metal powder layer (inorganic powder layer) and thus the solidified layer corresponds to a sintered layer, the three-dimensional shaped object can be used as a metal mold for a plastic injection molding, a press molding, a die casting, a casting or a forging.

CROSS REFERENCE TO RELATED PATENT APPLICATION

The present application claims the right of priority of Japanese Patent Application No. 2011-59484 (filed on Mar. 17, 2011, the title of the invention: "METHOD FOR MANUFACTURING THREE-DIMENSIONAL SHAPED OBJECT AND THREE-DIMENSIONAL SHAPED OBJECT"), the disclosure of which is incorporated herein by reference.

The invention claimed is:

1. A method for manufacturing a metal mold, the method comprising:
    forming a solidified layer by irradiating a predetermined portion of a powder layer of metal powder with a light beam, thereby allowing sintering of the powder of the predetermined portion or melting and subsequent solidification thereof; and
    forming another solidified layer by forming a new powder layer of metal powder on the resulting solidified layer, and then irradiating another predetermined portion of the new powder layer with the light beam, the formation of the solidified layer and the another solidified layer being repeatedly performed,
    wherein the metal mold is manufactured such that it has three different solidified portions defined by a high-density solidified portion, an intermediate-density solidified portion and a low-density solidified portion in at least a part of the metal mold,
    wherein a metal mold surface portion of the metal mold is composed of the high-density solidified portion and the intermediate-density solidified portion, the intermediate-density solidified portion having a solidified density of 70% to 90% is located in at least part of a surface region of the metal mold surface portion, the solidified density being defined by a ratio of a solidified region of the intermediate-density solidified portion to a total region of the intermediate density solidified portion, the total region being an aggregate of both the solidified region and a vacancy portion that does not include the solidified region, and
    wherein the intermediate-density solidified portion is provided in connection to the low-density solidified portion such that the intermediate-density solidified portion serves as a gas passage, and the low-density solidified portion extends to a back side of the metal mold, wherein the back side of the metal mold is opposite to the at least part of the surface region.

2. The method according to claim 1, wherein the intermediate-density solidified portion and the low-density solidified portion are formed to be located next to each other so that a gas can pass through the intermediate-density solidified portion and the low-density solidified portion.

3. The method according to claim 1, wherein the intermediate-density solidified portion is formed in such a step-by-step manner that a plurality of light beam irradiations are performed.

4. The method according to claim 3, wherein an irradiation energy density of the light beam irradiations is stepwise decreased.

5. The method according to claim 3, wherein a new powder material of metal powder is supplied to a region to be irradiated at a point in time between one of the light beam irradiations and the subsequent light beam irradiation.

6. The method according to claim 5, wherein, prior to the supply of the new powder material, a surface of the irradiated region by the one of the light beam irradiations is subjected to a machining process so that the irradiated region has a predetermined height.

7. The method according to claim 5, wherein, during the supply of the new powder material, the irradiated region by the one of the light beam irradiations and/or the powder material are/is subjected to a vibration.

8. A metal mold, comprising:
    a solidified layer formed by irradiating a predetermined portion of a powder layer of metal powder with a light beam, thereby allowing sintering of the powder of the predetermined portion or melting and subsequent solidification thereof; and
    another solidified layer formed by forming a new powder layer of metal powder on the resulting solidified layer, and then irradiating another predetermined portion of the new powder layer with the light beam, the formation of the solidified layer and the another solidified layer being repeatedly performed,
    wherein the metal mold has three different solidified portions defined by a high-density solidified portion, an intermediate-density solidified portion and a low-density solidified portion in at least a part of the metal mold,
    wherein a metal mold surface portion of the metal mold is composed of the high-density solidified portion and the intermediate-density solidified portion, the intermediate-density solidified portion having a solidified density of 70% to 90% is located in at least part of a surface region of the metal mold surface portion, the solidified density being defined by a ratio of a solidified region of the intermediate-density solidified portion to a total region of the intermediate density solidified portion, the total region being an aggregate of both the solidified region and a vacancy portion that does not include the solidified region, and wherein the intermediate-density solidified portion is provided in connection to the low-density solidified portion such that the intermediate-density solidified portion serves as a gas passage, and the low-density solidified portion extends to a back side of the metal mold, wherein the back side of the metal mold is opposite to the at least part of the surface region.

9. The metal mold according to claim 8, wherein a thickness of the intermediate-density solidified portion is in the range of 0.05 mm to 5 mm.

10. The metal mold according to claim 8, wherein a pore size of the intermediate-density solidified portion is 50 μm or less.

11. The method according to claim 1, wherein the high-density solidified portion is formed such that the combination of intermediate-density solidified portion and the low-density solidified portion is surrounded by the high-density solidified portion.

12. The method according to claim 1, wherein the low-density solidified portion is formed to be located behind the intermediate-density solidified portion.

13. The metal mold according to claim 8, wherein the metal mold is selected from one of a core metal mold and a cavity metal mold, and wherein the surface region of the metal mold surface portion is defined by at least a part of a cavity-forming surface of the one of the core metal mold and the cavity metal mold.

14. The metal mold according to claim 13, wherein the intermediate-density solidified portion and the low-density solidified portion are located next to each other, and thereby a gas vent of the one of the core metal mold and the cavity metal mold is provided.

* * * * *